US007843473B2

(12) United States Patent
Arimoto et al.

(10) Patent No.: US 7,843,473 B2
(45) Date of Patent: Nov. 30, 2010

(54) MATRIX DISPLAY WITH GAMMA CORRECTION BASED ON GAMMA CHARACTERISTICS PAIRS AND DIFFERENT INPUT TRANSMITTANCE LEVEL

(75) Inventors: Katsuyuki Arimoto, Okayama (JP); Takahiro Kobayashi, Okayama (JP); Yoshihito Ohta, Okayama (JP); Keizo Matsumoto, Akaiwa (JP)

(73) Assignee: Panasonic Corporation, Osaka (JP)

( * ) Notice: Subject to any disclaimer, the term of this patent is extended or adjusted under 35 U.S.C. 154(b) by 800 days.

(21) Appl. No.: 10/567,015

(22) PCT Filed: Oct. 7, 2004

(86) PCT No.: PCT/JP2004/015192

§ 371 (c)(1),
(2), (4) Date: Feb. 3, 2006

(87) PCT Pub. No.: WO2005/038766

PCT Pub. Date: Apr. 28, 2005

(65) Prior Publication Data

US 2006/0290626 A1 Dec. 28, 2006

(30) Foreign Application Priority Data

Oct. 16, 2003 (JP) ............................ 2003-356126

(51) Int. Cl.
*G09G 5/10* (2006.01)
*G09G 3/36* (2006.01)
*G06F 3/038* (2006.01)

(52) U.S. Cl. ........................................ 345/690; 345/89

(58) Field of Classification Search ................. 345/204, 345/690–694, 210, 89
See application file for complete search history.

(56) References Cited

U.S. PATENT DOCUMENTS

| | | | | |
|---|---|---|---|---|
| 5,489,917 | A * | 2/1996 | Ikezaki et al. | 345/89 |
| 5,847,688 | A | 12/1998 | Ohi et al. | |
| 2001/0026258 | A1* | 10/2001 | Yamashita et al. | 345/89 |
| 2002/0149598 | A1 | 10/2002 | Greier et al. | |
| 2003/0146893 | A1* | 8/2003 | Sawabe | 345/89 |
| 2003/0227429 | A1 | 12/2003 | Shimoshikiryo | |
| 2004/0046725 | A1* | 3/2004 | Lee | 345/88 |
| 2005/0128413 | A1* | 6/2005 | Son et al. | 349/143 |
| 2005/0213015 | A1 | 9/2005 | Shimoshikiryo | |

FOREIGN PATENT DOCUMENTS

JP 5-68221 3/1993

(Continued)

OTHER PUBLICATIONS

Supplementary European Search Report issued May 7, 2008 in the Application No. EP 04 79 2420.

*Primary Examiner*—Amr Awad
*Assistant Examiner*—Liliana Cerullo
(74) *Attorney, Agent, or Firm*—Wenderoth, Lind & Ponack, L.L.P.

(57) ABSTRACT

Gamma converter circuits use first to third types of first and second gamma-characteristics to gamma-convert an input video signal. Selectors select one pair among three pairs of gamma-characteristics in accordance with a transmittance to be used for display, and selects one of the six gamma corrected outputs such that both a distribution area ratio of pixels driven by the video signal as gamma corrected by use of the first gamma-characteristic of the selected pair of gamma characteristics and a distribution area ratio of pixels driven by the video signal as γ corrected by use of the second gamma-characteristic of the selected pair of gamma-characteristics are equal to a distribution area ratio specified in advance for the selected pair of gamma-characteristics.

13 Claims, 12 Drawing Sheets

FOREIGN PATENT DOCUMENTS

| | | |
|---|---|---|
| JP | 5-236400 | 9/1993 |
| JP | 7-121144 | 5/1995 |
| JP | 7-191634 | 7/1995 |
| JP | 8-15723 | 1/1996 |
| JP | 8-201777 | 8/1996 |
| JP | 9-90910 | 4/1997 |
| JP | 10-142577 | 5/1998 |
| JP | 2001-147673 | 5/2001 |
| JP | 2003-255307 | 9/2003 |
| JP | 2003-255908 | 9/2003 |
| JP | 2004-302270 | 10/2004 |
| WO | 02/059685 | 8/2002 |

* cited by examiner

MATRIX DISPLAY WITH GAMMA CORRECTION BASED ON GAMMA CHARACTERISTICS PAIRS AND DIFFERENT INPUT TRANSMITTANCE LEVEL

BACKGROUND OF THE INVENTION

1. Technical Field

The present invention relates to a matrix-type display apparatus which drives a plurality of pixels disposed in matrix form and displays an image, and its driving method.

2. Background Art

In a liquid-crystal display apparatus where a TN (or twisted nematic) system is used, a liquid crystal has a refractive-index anisotropy, a twist orientation, or the like. Thus, a beam of light which passes through a liquid-crystal layer is subjected to various birefringence effects, depending upon its direction or angle. This allows a complicated visual-angle dependence to appear. For example, the whole screen image becomes whitish at an upper visual angle while the entire screen image becomes dark at a lower visual angle. Besides, light and shade are reversed within an image's low-luminance range. In terms of these visual-angle characteristics, various techniques have been developed for widening a viewing angle about a luminance, a hue, a contrast characteristic, a gradation characteristic, or the like.

For example, Japanese Patent Laid-Open No. 5-68221 specification discloses a liquid-crystal display apparatus. If the number of times at which a signal is written in one pixel for a one-field period is n, then n+1 levels are driven using only two black and white values. The other levels are driven using a combination of a gray level and white or black level. Thereby, a γ-characteristic (i.e., a transmittance characteristic according to an input level) is changed.

In addition, another liquid-crystal display apparatus is disclosed in Japanese Patent Laid-Open No. 9-90910 specification. A plurality of applied voltages which are generated by a plurality of conversion methods of converting input signals at the same level into different applied voltages are selectively applied for each pixel. Thereby, two different types of γ-characteristics are switched so that the distribution area ratios are identical.

However, in the former liquid-crystal display apparatus, two black and white values are used only in the case where the transmittance to be used for display is 50 percent. Then, a combination of a gray level and white or black level is used in the case of the other transmittances. Hence, a viewing angle characteristic can be improved at a transmittance of 50 percent. However, at a transmittance other than this, for example, at 25 percent or 75 percent, if a viewing angle is deflected, a γ-characteristic after synthesized deviates largely from an intrinsic γ-characteristic. This makes it impossible to realize a good viewing angle characteristic at a wide-ranging transmittance.

Furthermore, in the latter liquid-crystal display apparatus, a synthetic γ-characteristic is used which is obtained through a synthesis after two types of γ-characteristics are changed so that the distribution area ratios are the same. Therefore, if a viewing angle is deflected, then in accordance with a transmittance, a γ-characteristic after synthesized deviates largely from an intrinsic γ-characteristic. Even in this case, a good viewing angle characteristic cannot be realized at a wide-ranging transmittance.

SUMMARY OF THE INVENTION

It is an object of the present invention to provide a matrix-type display apparatus and its driving method which are capable of realizing a good viewing angle characteristic at a wide-ranging transmittance.

A matrix-type display apparatus according to an aspect of the present invention which drives a display panel including a plurality of pixels disposed in matrix form and displays an image, characterized by including: a converting means for γ-converting an input video signal, using n (which is an integer of two or above) pairs of γ-characteristics which are made up of first and second γ-characteristics different from each other; and a selecting means for selecting one pair of γ-characteristics from among the n pairs of γ-characteristics according to a transmittance to be used for display, and selecting an output supplied to the display panel from among the 2n outputs which are γ-corrected by the converting means, so that a first distribution area ratio of pixels driven by the video signal γ-corrected by use of the first γ-characteristic of the selected pairs of γ-characteristics and a second distribution area ratio of pixels driven by the video signal γ-corrected by use of the second γ-characteristic of the selected pairs of γ-characteristics are equal to a distribution area ratio specified in advance for the selected pairs ofγ-characteristics.

In this matrix-type display apparatus, a video signal is γ-converted, using n (which is an integer of two or above) pairs of γ-characteristics which are made up of first and second γ-characteristics different from each other. Then, one pair of γ-characteristics are selected from among the n pairs of γ-characteristics according to a transmittance to be used for display, and an output supplied to the display panel is selected from among the 2n outputs so that a first distribution area ratio of pixels driven by the video signal γ-corrected by use of the first γ-characteristic of the selected pairs of γ-characteristics and a second distribution area ratio of pixels driven by the video signal γ-corrected by use of the second γ-characteristic of the selected pairs of γ-characteristics are equal to a distribution area ratio specified in advance for the selected pairs of γ-characteristics. Therefore, the video signals γ-corrected by use of the first and the second γ-characteristics suitable for a transmittance to be used for display are selected to be a distribution area ratio suitable for the transmittance to be used for display. This helps realize a good viewing angle characteristic at a wide-ranging transmittance.

It is preferable that the selecting means select an output supplied to the display panel from among the 2n outputs which are γ-corrected by the converting means, so that the first distribution area ratio and the second distribution area ratio are equal to the distribution area ratio in a block unit of (n+1) pixels per block. Herein, preferably, the first distribution area ratio and the second distribution area ratio for each pair of γ-characteristics should be selected out of k/(n+1) and (1−k)/(n+1), if k is an integer of one to n.

In this case, in a block unit of (n+1) pixels per block, the first distribution area ratio and the second distribution area ratio can be equated with the distribution area ratio suitable for a transmittance to be used for display. Therefore, using a general display panel in which each pixel has one and the same formation, a good viewing angle characteristic can be realized at a wide-ranging transmittance.

Each pixel of the display panel may also be made up of, as one pixel, a first sub-pixel which has a first pixel area Sa and a second sub-pixel which has a second pixel area Sb (=m×Sa, herein, m>1), and the selecting means may also select an output supplied to the display panel from among the 2n outputs which are γ-corrected by the converting means, so that the first distribution area ratio and the second distribution area ratio are equal to the distribution area ratio in a block unit of the one pixel per block. Herein, preferably, the first distribution area ratio and the second γ-distribution area ratio for each pair of γ-characteristics should be selected out of 1/(m+1) and m/(m+1).

In this case, in a block unit of the first sub-pixel and the second sub-pixel per block, the first distribution area ratio and the second distribution area ratio can be equated with the distribution area ratio suitable for a transmittance to be used for display. Therefore, using a display panel which includes two types of sub-pixels, a good viewing angle characteristic can be realized at a wide-ranging transmittance.

It is preferable that the second pixel area Sb satisfy the relation of 1.5Sa≦Sb≦3Sa. In this case, without lowering a display definition, using a display panel which includes two types of sub-pixels, a good viewing angle characteristic can be realized at a wide-ranging transmittance.

Each pixel of the display panel may also be made up of, as one pixel, a first sub-pixel which has a first pixel area Sa and a second sub-pixel which has a second pixel area Sb (=m×Sa, herein, m>1), and the selecting means may also select an output supplied to the display panel from among the 2n outputs which are γ-corrected using each γ-characteristic by the converting means, so that the first distribution area ratio and the second distribution area ratio are equal to the distribution area ratio in a block unit of the two pixels per block. Herein, preferably, the first distribution area ratio and the second γ-distribution area ratio for each pair of γ-characteristics should be selected from among 1/(2+2m), m/(2+2m), 2/(2+2m), (1+m)/(2+2m), 2m/(2+2m), (2+m)/(2+2m), and (2m+1)/(2+2m).

In this case, in a block unit of the two first sub-pixels and the two second sub-pixels per block, the first distribution area ratio and the second distribution area ratio can be equated with the distribution area ratio suitable for a transmittance to be used for display. Therefore, the number of distribution area ratios to be set can be raised, thus increasing the number of pairs of γ-characteristics. Accordingly, using a display panel which includes two types of sub-pixels, a good viewing angle characteristic can be realized at a wide-ranging transmittance.

It is preferable that the second pixel area Sb satisfy the relation of 1.2Sa≦Sb≦2Sa. In this case, without lowering a display definition, using a display panel which includes two types of sub-pixels, a good viewing angle characteristic can be realized at a wide-ranging transmittance.

Preferably, the selecting means should select an output supplied to the display panel from among the 2n outputs which are γ-corrected by the converting means, in a unit of one pixel made up of an R-pixel, a G-pixel and a B-pixel. In this case, the γ-characteristic is changed in a unit of one pixel made up of an R-pixel, a G-pixel and a B-pixel. This makes it possible to simplify the configuration of the apparatus.

It is preferable that the selecting means select an output supplied to the display panel from among the 2n outputs which are γ-corrected by the converting means, for each of an R-pixel, a G-pixel and a B-pixel which are each set as one pixel. In this case, the γ-characteristic can be changed in each pixel unit of an R-pixel, a G-pixel and a B-pixel. This makes it possible to simplify the configuration of the apparatus. Therefore, the γ-characteristic can be used according to each characteristic of the R-pixel, the G-pixel and the B-pixel. This helps realize a good viewing angle characteristic at a wide-ranging transmittance.

Preferably, the display panel should be a liquid-crystal display panel. In this case, in a liquid-crystal display apparatus which has a great viewing angle characteristic, a good viewing angle characteristic can be realized at a wide-ranging transmittance.

A driving method for a matrix-type display apparatus according to another aspect of the present invention which drives a display panel including a plurality of pixels disposed in matrix form and displays an image, characterized by including: a converting step of γ-converting an input video signal, using n (which is an integer of two or above) pairs of γ-characteristics which are made up of first and second γ-characteristics different from each other; and a selecting step of selecting one pair of γ-characteristics from among the n pairs of γ-characteristics according to a transmittance to be used for display, and selecting an output supplied to the display panel from among the 2n outputs which are γ-corrected in the converting step, so that a first distribution area ratio of pixels driven by the video signal γ-corrected by use of the first γ-characteristic of the selected pairs of γ-characteristics and a second distribution area ratio of pixels driven by the video signal γ-corrected by use of the second γ-characteristic of the selected pairs of γ-characteristics are equal to a distribution area ratio specified in advance for the selected pairs of γ-characteristics.

In this driving method for a matrix-type display apparatus, a video signal is γ-converted, using n (which is an integer of two or above) pairs of γ-characteristics which are made up of first and second γ-characteristics different from each other. Then, one pair of -characteristics are selected from among the n pairs of γ-characteristics according to a transmittance to be used for display, and an output supplied to the display panel is selected from among the 2n outputs so that a first distribution area ratio of pixels driven by the video signal as γ corrected by use of the first γ-characteristic of the selected pairs of γ-characteristics and a second distribution area ratio of pixels driven by the video signal as γ corrected by use of the second γ-characteristic of the selected pairs of γ-characteristics are equal to a distribution area ratio specified in advance for the selected pairs of γ-characteristics. Therefore, the video signals as γ corrected by use of the first and the second γ-characteristics suitable for a transmittance to be used for display are selected to be a distribution area ratio suitable for the transmittance to be used for display. This helps realize a good viewing angle characteristic at a wide-ranging transmittance.

DETAILED DESCRIPTION OF THE INVENTION

Hereinafter, a matrix-type display apparatus according to the present invention will be described with reference to the attached drawings. In each embodiment described below, a liquid-crystal display apparatus is described as an example of the matrix-type display apparatus. However, the matrix-type display apparatus to which the present invention is applied is not limited especially to this example. It can be similarly applied to another matrix-type display apparatus such as an organic EL (or electro-luminescence) display apparatus, as long as it has a viewing angle characteristic.

Figure 1:
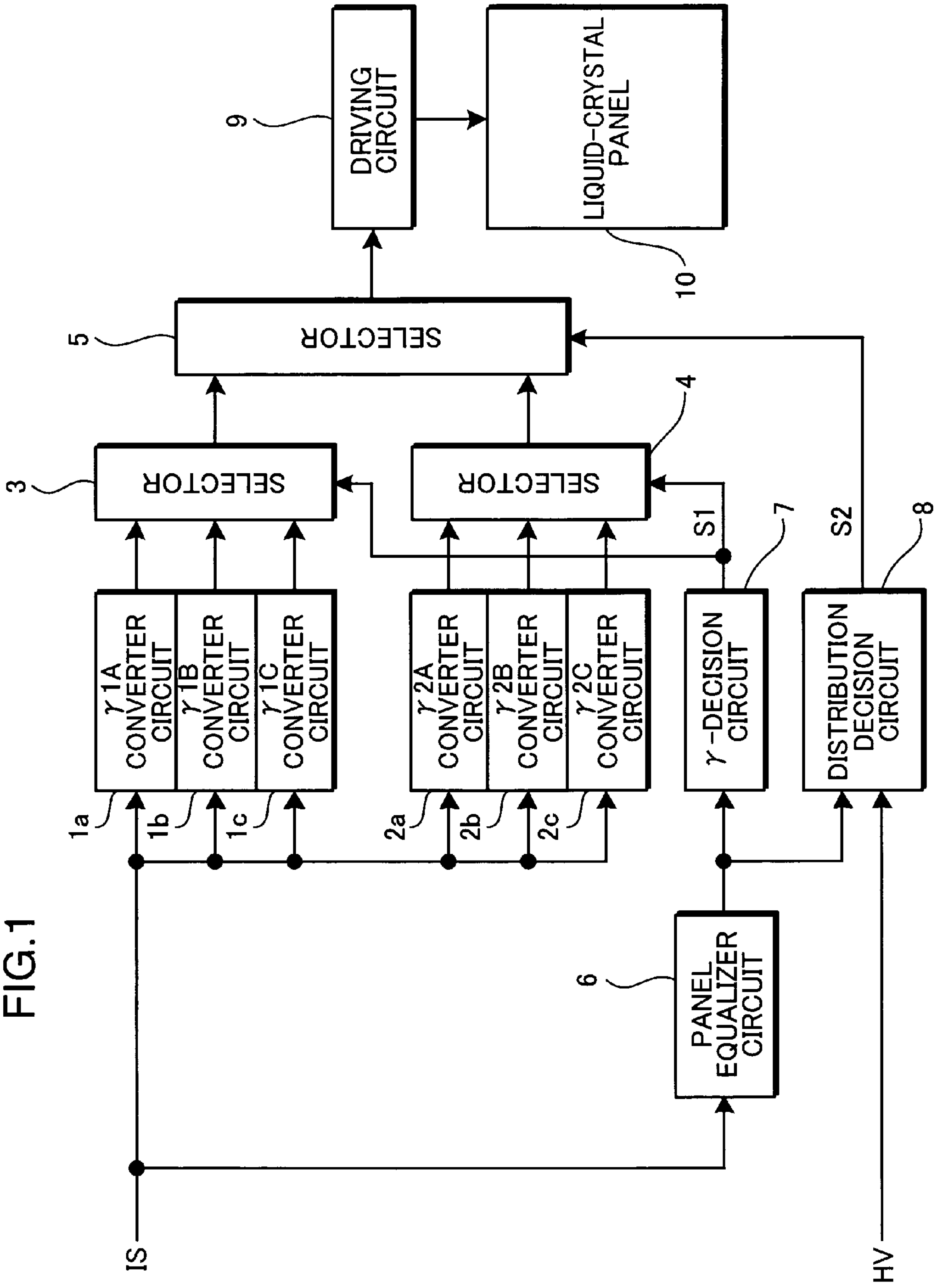
FIG. 1 is a block diagram, showing the configuration of a liquid-crystal display apparatus according to a first embodiment of the present invention.

FIG. 1 is a block diagram, showing the configuration of a liquid-crystal display apparatus according to a first embodiment of the present invention. The liquid-crystal display apparatus shown in FIG. 1 includes: a γ1A converter circuit 1*a*; a γ1B converter circuit 1*b*; a γ1C converter circuit 1*c*; a γ2A converter circuit 2*a*; a γ2B converter circuit 2*b*; a γ2C converter circuit 2*c*; selectors 3 to 5; a panel equalizer circuit 6; a γ-decision circuit 7; a distribution decision circuit 8; a driving circuit 9; and a liquid-crystal panel 10.

In the γ1A converter circuit 1*a*, the γ1B converter circuit 1*b*, the γ1C converter circuit 1*c*, the γ2A converter circuit 2*a*, the γ2B converter circuit 2*b*, the γ2C converter circuit 2*c* and the panel equalizer circuit 6, a video signal IS is inputted which is separate according to each color component of R, G, B. In the distribution decision circuit 8, a synchronizing signal HV of the video signal IS is inputted, such as a vertical synchronizing signal and a horizontal synchronizing signal. The video signal IS and the synchronizing signal HV are signals which are inputted from a predetermined video output circuit (not shown) or the like.

The γ1A converter circuit 1*a* γ-converts the video signal IS, using a first type of first γ-characteristic γ1A. Then, it outputs the γ-corrected video signal to the selector 3. The γ2A converter circuit 2*a* γ-converts the video signal IS, using a first type of second γ-characteristic γ2A. Then, it outputs the γ-corrected video signal to the selector 4. Herein, the first type of first γ-characteristic γ1A and second γ-characteristic γ2A are γ-characteristics which are complementary to each other. They are the first type of pair of γ-characteristics used for the video signal IS which has a low transmittance.

Figure 2:
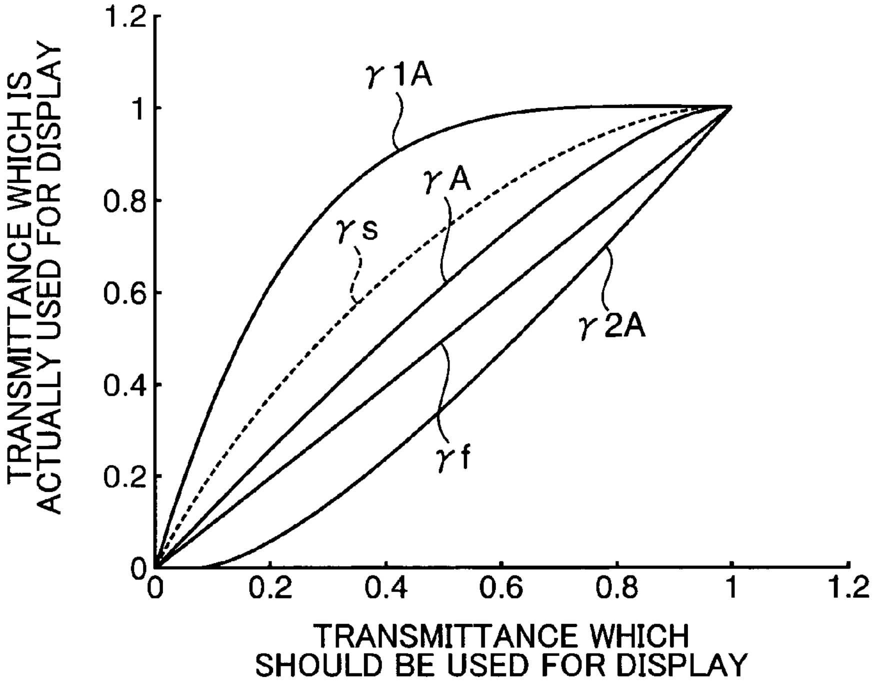
FIG. 2 is a graphical representation, showing an example of a first type of first γ-characteristic γ1A and second γ-characteristic γ2A which are used in the liquid-crystal display apparatus shown in FIG. 1.

FIG. 2 is a graphical representation, showing an example of the first type of first γ-characteristic γ1A and second γ-characteristic γ2A which are used in the liquid-crystal display apparatus shown in FIG. 1. In FIG. 2, as the first type of γ-characteristics (i.e., the transmittance characteristics which correspond to an input level), a transmittance (which is equivalent to an input) which should be used for display is used as the horizontal axis and a transmittance (which is equivalent to an output) which is actually used for display is used as the vertical axis. These graphs indicate γ-characteristics in such a case, and each transmittance is a normalized value.

A reference γ-characteristic γf at the front vision (zero degrees) is linear. As shown in the figure, a γ-characteristic γs at a non-front vision (e.g., horizontal 45 degrees) is shifted from γf, so that it is deteriorated. Incidentally, these reference γ-characteristic γf and γ-characteristic γs at a non-front vision are also the same in the following embodiments. Hence, their description is omitted below.

As shown in FIG. 2, the γ1A converter circuit 1*a* has the first type of first γ-characteristic γ1A, and the γ2A converter circuit 2*a* has the first type of second γ-characteristic γ2A. The output of the γ1A converter circuit 1*a* and the output of the γ2A converter circuit 2*a* are switched using a change pattern (described later) for a first type of pair of γ-characteristics. Thereby, the first type of first γ-characteristic γ1A and the first type of second γ-characteristic γ2A are synthesized, so that the γ-characteristic after synthesized becomes a first type of synthetic γ-characteristic γA. If this first type of synthetic γ-characteristic γA is compared with the reference γ-characteristic γf at the front vision (zero degrees) as well as the γ-characteristic γs at a non-front vision, the discrepancy between it and γf is smaller than that between it and γs. Hence, it can be seen that its characteristic is improved. Besides, the discrepancy between it and the reference γ-characteristic γf can be seen to be smaller within the range where the transmittance which should be used for display is lower.

Herein, the distribution area ratio of pixels driven using the output of the γ1A converter circuit 1*a* and the distribution area ratio of pixels driven using the output of the γ2A converter circuit 2*a* are set at 1/4:3/4. If the transmittance which should be used for display is x, the first type of first γ-characteristic γ1A and second γ-characteristic γ2A are predetermined so that γ1A(x)+3×γ2A(x)=4x is satisfied.

This means maintaining such a relation that the average after multiplied by the distribution area ratios becomes the transmittance x which should be used for display. In other words, it indicates that the transmittance which has been used for display according to the first γ-characteristic and the second γ-characteristic becomes, on average, the initial transmittance x which should be used for display. Incidentally, the following description is also the same.

In this embodiment, the first type of first γ-characteristic γ1A and second γ-characteristic γ2A are determined, for example, as a reference, using the skin color of the video signal IS. This is because the skin color is a color to which humans are most visually-sensitive and visual sense characteristics on the skin color is most visible. In this respect, the other γ-characteristics are also the same.

The γ1B converter circuit 1*b* γ-converts the video signal IS, using a second type of first γ-characteristic γ1B. Then, it outputs the γ-corrected video signal to the selector 3. The γ2B converter circuit 2*b* γ-converts the video signal IS, using a second type of second γ-characteristic γ2B. Then, it outputs the γ-corrected video signal to the selector 4. Herein, the second type of first γ-characteristic γ1B and second γ-characteristic γ2B are γ-characteristics which are complementary to each other. They are the second type of pair of γ-characteristics used for the video signal IS which has an intermediate transmittance.

Figure 3:
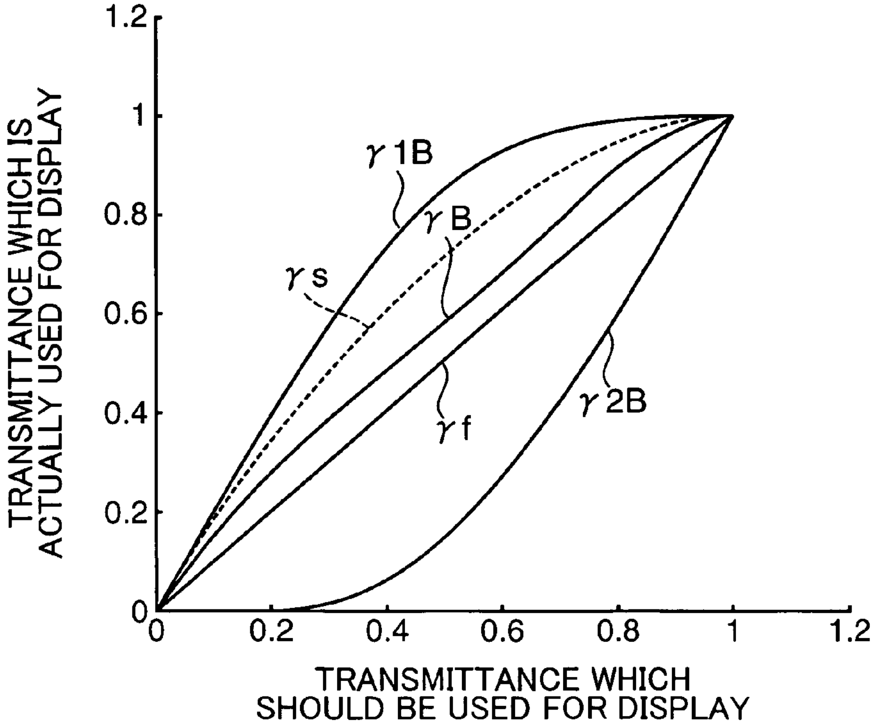
FIG. 3 is a graphical representation, showing an example of a second type of first γ-characteristic γ1B and second γ-characteristic γ2B which are used in the liquid-crystal display apparatus shown in FIG. 1.

FIG. 3 is a graphical representation, showing an example of the second type of first γ-characteristic γ1B and second γ-characteristic γ2B which are used in the liquid-crystal display apparatus shown in FIG. 1. As shown in FIG. 3, the γ1B converter circuit 1*b* has the second type of first γ-characteristic γ1B, and the γ2B converter circuit 2*b* has the second type of second γ-characteristic γ2B. The output of the γ1B converter circuit 1*b* and the output of the γ2B converter circuit 2*b* are switched using a change pattern (described later) for a second type of pair of γ-characteristics. Thereby, the second type of first γ-characteristic γ1B and the second type of second γ-characteristic γ2B are synthesized, so that the γ-characteristic after synthesized becomes a second type of synthetic γ-characteristic γB. If this second type of synthetic γ-characteristic γB is compared with the reference γ-characteristic γf at the front vision as well as the γ-characteristic γs at a non-front vision, the discrepancy between it and γf is smaller than that between it and γs. Hence, it can be seen that its characteristic is improved. Besides, the discrepancy between it and the reference γ-characteristic γf can be seen to be smaller within the range where the transmittance which should be used for display is intermediate.

Herein, the distribution area ratio of pixels driven using the output of the γ1B converter circuit 1*b* and the distribution area ratio of pixels driven using the γ2B converter circuit 2*b* are set at 2/4:2/4. If the transmittance which should be used for display is x, the second type of first γ-characteristic γ1B and second γ-characteristic γ2B are predetermined so that 2×γ1B(x)+2×γ2B(x)=4x is satisfied.

The γ1C converter circuit 1*c* γ-converts the video signal IS, using a third type of first γ-characteristic γ1C. Then, it outputs the γ-corrected video signal to the selector 3. The γ2C converter circuit 2*c* γ-converts the video signal IS, using a third type of second γ-characteristic γ2C. Then, it outputs the γ-corrected video signal to the selector 4. Herein, the third type of first γ-characteristic γ1C and second γ-characteristic γ2C are γ-characteristics which are complementary to each other. They are the third type of pair of γ-characteristics used for the video signal IS which has a high transmittance.

Figure 4:
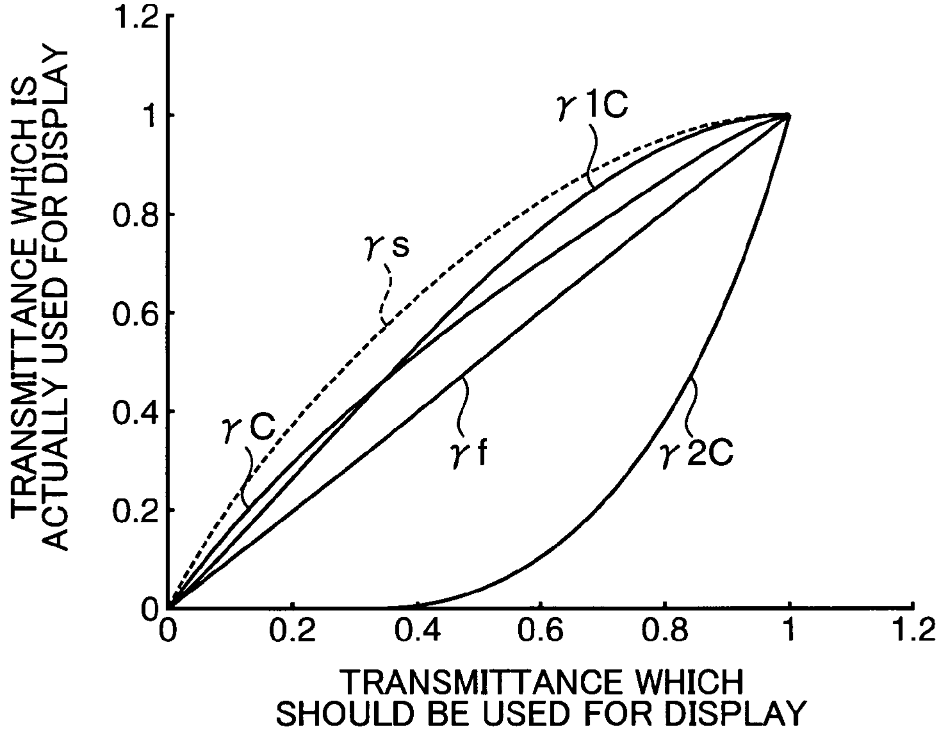
FIG. 4 is a graphical representation, showing an example of a third type of first γ-characteristic γ1C and second γ-characteristic γ2C which are used in the liquid-crystal display apparatus shown in FIG. 1.

FIG. 4 is a graphical representation, showing an example of the third type of first γ-characteristic γ1C and second γ-characteristic γ2C which are used in the liquid-crystal display apparatus shown in FIG. 1. As shown in FIG. 4, the γ1C converter circuit 1*c* has the third type of first γ-characteristic γ1C, and the γ2C converter circuit 2*c* has the third type of second γ-characteristic γ2C. The output of the γ1C converter circuit 1*c* and the γ2C converter circuit 2*c* are switched using a change pattern (described later) for a third type of pair of γ-characteristics. Thereby, the third type of first γ-characteristic γ1C and the third type of second γ-characteristic γ2C are synthesized, so that the y-characteristic after synthesized becomes a third type of synthetic γ-characteristic γC. If this third type of synthetic γ-characteristic γC is compared with the reference γ-characteristic γf at the front vision as well as the γ-characteristic γs at a non-front vision, the discrepancy between it and γf is smaller than that between it and γs. Hence, it can be seen that its characteristic is improved. Besides, the discrepancy between it and the reference γ-characteristic γf can be seen to be smaller within the range where the transmittance which should be used for display is higher.

Herein, the distribution area ratio of pixels driven using the output of the γ1C converter circuit 1*c* and the distribution area ratio of pixels driven using the γ2C converter circuit 2*c* are set at 3/4:1/. If the transmittance which should be used for display is x, the third type of first γ-characteristic γ1C and second γ-characteristic γ2C are predetermined so that 3×γ1C(x)+γ2C(x)=4x is satisfied.

Incidentally, the configuration of a γ-converter circuit is not limited especially to the above described example, and thus, various changes can be made. A variety of configurations can be used, such as an analog system, an arithmetic system and an ROM-table system. Besides, in a liquid-crystal display apparatus, because of characteristics of a color filter, a back light, or the like, γ-characteristics are not coincident over every gradation among RGB signals. Hence, it has a color-shift characteristic. Therefore, in order to restrain a change in hue or the like and correct a viewing angle, a γ-converter circuit may be provided for each RGB signal.

The panel equalizer circuit 6 is a circuit which has a conversion characteristic equivalent to an input-and-output characteristic P(x) of the liquid-crystal panel 10. It outputs a video signal into which the video signal IS has been converted using the input-and-output characteristic P(x) of the liquid-crystal panel 10, to the γ-decision circuit 7 and the distribution decision circuit 8.

The γ-decision circuit 7 specifies a transmittance to be used for display from the video signal corrected by use of the input-and-output characteristic P(x) of the liquid-crystal panel 10. Then, it outputs, to the selectors 3 and 4, a selection signal S1 for selecting a γ-converter circuit which executes a γ-conversion using the pair of γ-characteristics which corresponds to the transmittance it has specified. The relation between a transmittance and first to third types of pairs of γ-characteristics is stored in advance, for example, in an ROM-table form or the like inside of the γ-decision circuit 7.

The distribution decision circuit 8 specifies the pixel position of the video signal IS on the display screen of the liquid-crystal panel 10, as a reference, using the vertical synchronizing signal and horizontal synchronizing signal of the synchronizing signal HV. It also specifies a transmittance to be used for display from the video signal corrected by use of the input-and-output characteristic P(x) of the liquid-crystal panel 10. Then, it outputs, to the selector 5, a selection signal S2 for changing the γ-characteristic using the change pattern which corresponds beforehand to the pair of γ-characteristics of the transmittance it has specified. Incidentally, the configuration of a γ-decision circuit and a distribution decision circuit is not limited especially to the above described example, and thus, various changes can be made. Without the panel equalizer circuit 6, a transmittance may also be calculated from the video signal IS in a γ-decision circuit and a distribution decision circuit.

The selector 3 selects one output from among the three outputs of the γ1A converter circuit 1*a*, the γ1B converter circuit 1*b* and the γ1C converter circuit 1*c* according to the selection signal S1. Then, it outputs it to the selector 5. It selects the output of the γ1A converter circuit 1*a* if the transmittance is low, selects the output of the γ1B converter circuit 1*b* if the transmittance is intermediate, and selects the output of the γ1C converter circuit 1*c* if the transmittance is high.

The selector 4 selects one output from among the three outputs of the γ2A converter circuit 2*a*, the γ2B converter circuit 2*b* and the γ2C converter circuit 2*c* according to the selection signal S1. Then, it outputs it to the selector 5. It selects the output of the γ2A converter circuit 2*a* if the transmittance is low, selects the output of the γ2B converter circuit 2*b* if the transmittance is intermediate, and selects the output of the γ2C converter circuit 2*c* if the transmittance is high.

The selector 5 selects one output out of the two outputs of the selectors 3, 4 according to the selection signal S2 and outputs it to the driving circuit 9. If the transmittance is low, it switches the outputs of the γ1A converter circuit la and the γ2A converter circuit 2*a* to a change pattern for a first type of pair of γ-characteristics. If the transmittance is intermediate, it switches the outputs of the γ1B converter circuit 1*b* and the γ2B converter circuit 2*b* to a change pattern for a second type of pair of γ-characteristics. If the transmittance is high, it switches the outputs of the γ1C converter circuit 1*c* and the γ2C converter circuit 2*c* to a change pattern for a third type of pair of γ-characteristics.

Figure 5A:
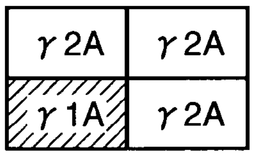
FIGS. 5A to 5C are illustrations, showing an example of change patterns for first to third types of pairs of γ-characteristics which are used in the liquid-crystal display apparatus shown in FIG. 1.
Figure 5B:
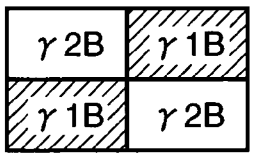
Figure 5C:
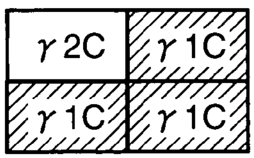

FIGS. 5A to 5C are illustrations, showing an example of the change patterns for the first to third types of pairs of γ-characteristics which are used in the liquid-crystal display apparatus shown in FIG. 1. FIG. 5A shows the change pattern for the first type of pair of γ-characteristics. FIG. 5B shows the change pattern for the second type of pair of γ-characteristics. FIG. 5C shows the change pattern for the third type of pair of γ-characteristics. In FIGS. 5A to 5C, only patterns for four adjacent pixels are indicated. These patterns are repeated on the liquid-crystal panel 10, so that the γ-characteristics are changed over the whole display screen. Incidentally, the polarity of a driving voltage for each pixel is inverted in each frame, but in FIGS. 5A to 5C, such a polarity is not shown in the figure.

First, as shown in FIG. 5A, in the change pattern for the first type of pair of γ-characteristics, the first type of first γ-characteristic γ1A is used only for one pixel (i.e., the lower-left pixel) of the four pixels. The first type of second γ-characteristic γ2A is used for the other pixels. Therefore, the percentage of the distribution area ratio of pixels driven using the output of the first type of first γ-characteristic γ1A and the distribution area ratio of pixels driven using the output of the first type of second γ-characteristic γ2A is 1/4:3/4.

Next, as shown in FIG. 5B, in the change pattern for the second type of pair of γ-characteristics, the second type of first γ-characteristic γ1B is used for two pixels (i.e., the lower-left and upper-right pixels) of the four pixels. The second type of second γ-characteristic γ2B is used for the other two pixels. Therefore, the percentage of the distribution area ratio of pixels driven using the output of the second type of first γ-characteristic γ1B and the distribution area ratio of pixels driven using the output of the second type of second γ-characteristic γ2B is 2/4:2/4.

Lastly, as shown in FIG. 5C, in the change pattern for the third type of pair of γ-characteristics, the third type of second γ-characteristic γ2C is used only for one pixel (i.e., the upper-left pixel) of the four pixels. The third type of first γ-characteristic γ1C is used for the other pixels. Therefore, the percentage of the distribution area ratio of pixels driven using the output of the third type of first γ-characteristic γ1C and the distribution area ratio of pixels driven using the output of the third type of second γ-characteristic γ2C is 3/4:1/4.

The driving circuit 9 is formed by a polarity inverting circuit, a gate driving circuit, a source driving circuit, or the like. Using a video signal outputted from the selector 5, it drives the liquid-crystal panel 10 through the source driving circuit. Then, it displays an image indicated by the video signal IS in the liquid-crystal panel 10. The liquid-crystal panel 10 is a liquid-crystal panel which includes a plurality of pixels disposed in matrix form. For example, a TN (or twisted nematic) liquid-crystal panel, or a PVA (or patterned vertical alignment) liquid-crystal panel, can be used.

Herein, the number of pairs of γ-characteristics is not limited especially to the above described example. Two, four, or more, may also be used. Furthermore, the change pattern is not limited especially to the above described example, and thus, another change pattern may also be used. Moreover, the pixel unit in which the γ-characteristic is changed is not limited especially to the above described example. It may also be changed for an R-pixel, a G-pixel and a B-pixel, respectively, as one pixel. In addition, the configuration of a selector is not limited especially to the above described example. Various changes can be made, including forming the selectors 3 to 5 by a single selector. In these respects, the other embodiments are also the same.

In this embodiment, the liquid-crystal panel 10 corresponds to an example of the display panel; the γ1A converter circuit 1*a*, the γ1B converter circuit 1*b*, the γ1C converter circuit 1*c*, the γ2A converter circuit 2*a*, the γ2B converter circuit 2*b* and the γ2C converter circuit 2*c*, to an example of the converting means; and the selectors 3 to 5, the γ-decision circuit 7 and the distribution decision circuit 8, to an example of the selecting means.

Herein, let's generalize the above described processing. If the number of types of pairs of γ-characteristics is n (which is an integer of two or above), then in a block unit of (n+1) pixels per block, one output is selected from among the 2n γ-corrected outputs, so that the distribution area ratio of first pixels driven by a video signal γ-corrected by use of the first γ-characteristic of each pair of γ-characteristics and the distribution area ratio of second pixels driven by a video signal γ-corrected by use of the second γ-characteristic are equal to a distribution area ratio specified in advance for each pair of γ-characteristics. At this time, the first and second distribution area ratios for each pair of γ-characteristics are selected out of k/(n+1) and (1−k)/(n+1), if k is an integer of one to n.

Figure 6:
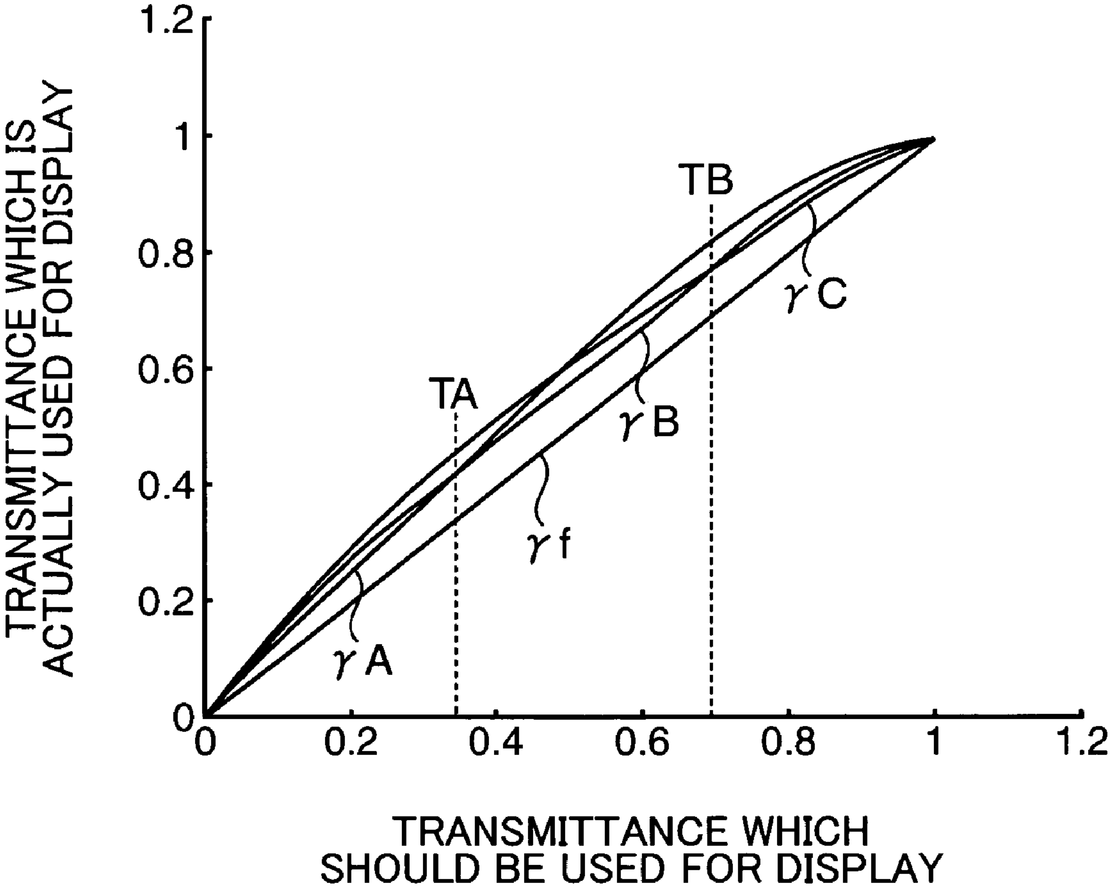
FIG. 6 is a graphical representation, showing an example of the control of a γ-characteristic in accordance with a transmittance in the liquid-crystal display apparatus shown in FIG. 1.

Next, an example will be described of the control of a γ-characteristic in accordance with a transmittance in the liquid-crystal display apparatus which has the above described configuration. FIG. 6 is a graphical representation, showing the example of the control of a γ-characteristic in accordance with a transmittance in the liquid-crystal display apparatus shown in FIG. 1.

As shown in FIG. 6, first, if the transmittance which should be used for display is within a range of 0 to TA, the γ-decision circuit 7 outputs, to the selectors 3, 4, a selection signal S1 for selecting the γ1A converter circuit 1*a* and the γ2A converter circuit 2*a*. Then, the selectors 3, 4 select the outputs of the γ1A converter circuit 1*a* and the γ2A converter circuit 2*a* and output them to the selector 5. The distribution decision circuit 8 outputs, to the selector 5, a selection signal S2 for changing the outputs of the γ1A converter circuit 1*a* and the γ2A converter circuit 2*a* using a change pattern for the first type of pair of γ-characteristics. Using the change pattern for the first type of pair of γ-characteristics, the selector 5 switches the outputs of the γ1A converter circuit 1*a* and the γ2A converter circuit 2*a*. Then, it outputs, to the driving circuit 9, a video signal γ-corrected by use of the first type of synthetic γ-characteristic γA. As a result, if the transmittance which should be used for display is within the range of 0 to TA, the liquid-crystal panel 10 can be driven using the video signal γ-corrected by use of the first type of synthetic γ-characteristic γA which is least shifted from the reference γ-characteristic γf.

Next, if the transmittance which should be used for display is within a range of TA to TB, the γ-decision circuit 7 outputs, to the selectors 3, 4, a selection signal S1 for selecting the γ1B converter circuit 1*b* and the γ2B converter circuit 2*b*. Then, the selectors 3, 4 select the outputs of the γ1B converter circuit 1*b* and the γ2B converter circuit 2*b* and output them to the selector 5. The distribution decision circuit 8 outputs, to the selector 5, a selection signal S2 for changing the outputs of the γ1B converter circuit 1*b* and the γ2B converter circuit 2*b* using a change pattern for the second type of pair of γ-characteristics. Using the change pattern for the second type of pair of γ-characteristics, the selector 5 switches the outputs of the γ1B converter circuit 1*b* and the γ2B converter circuit 2*b*. Then, it outputs, to the driving circuit 9, a video signal γ-corrected by use of the second type of synthetic γ-characteristic γB. As a result, if the transmittance which should be used for display is within the range of TA to TB, the liquid-crystal panel 10 can be driven using the video signal γ-corrected by use of the second type of synthetic γ-characteristic γB which is least shifted from the reference γ-characteristic γf.

Sequentially, if the transmittance which should be used for display is within a range of TB to 1, the γ-decision circuit 7 outputs, to the selectors 3, 4, a selection signal S1 for selecting the γ1C converter circuit 1*c* and the. γ2C converter circuit 2*c*. Then, the selectors 3, 4 select the outputs of the γ1C converter circuit 1*c* and the γ2C converter circuit 2*c* and output them to the selector 5. The distribution decision circuit 8 outputs, to the selector 5, a selection signal S2 for changing the outputs of the γ1C converter circuit 1*c* and the γ2C converter circuit 2*c* using a change pattern for the third type of pair of γ-characteristics. Using the change pattern for the third type of pair of γ-characteristics, the selector 5 switches the outputs of the γ1C converter circuit 1*c* and the γ2C converter circuit 2*c*. Then, it outputs, to the driving circuit 9, a video signal γ-corrected by use of the third type of synthetic γ-characteristic γC. As a result, if the transmittance which should be used for display is within the range of TB to 1, the liquid-crystal panel 10 can be driven using the video signal γ-corrected by use of the third type of synthetic γ-characteristic γC which is least shifted from the reference γ-characteristic γf.

In this way, in this embodiment, the video signal IS is γ-converted, using three pairs of γ-characteristics which are made up of first and second γ-characteristics different from each other. Then, one pair of γ-characteristics are selected from among the three pairs of γ-characteristics according to a transmittance to be used for display, and one output is selected from among the six outputs so that the distribution area ratio of pixels driven by the video signal γ-corrected by use of the first γ-characteristic of the selected pairs of γ-characteristics and the distribution area ratio of pixels-driven by the video signal as γ-corrected by use of the second γ-characteristic of the selected pairs of γ-characteristics are equal to a distribution area ratio specified in advance for each pair of γ-characteristics. Therefore, the video signals γ-corrected by use of the first and the second γ-characteristics most suitable for a transmittance to be used for display are selected at the most suitable distribution area ratio for the transmittance to be used for display. This helps realize a good viewing angle characteristic at every transmittance.

Figure 7:
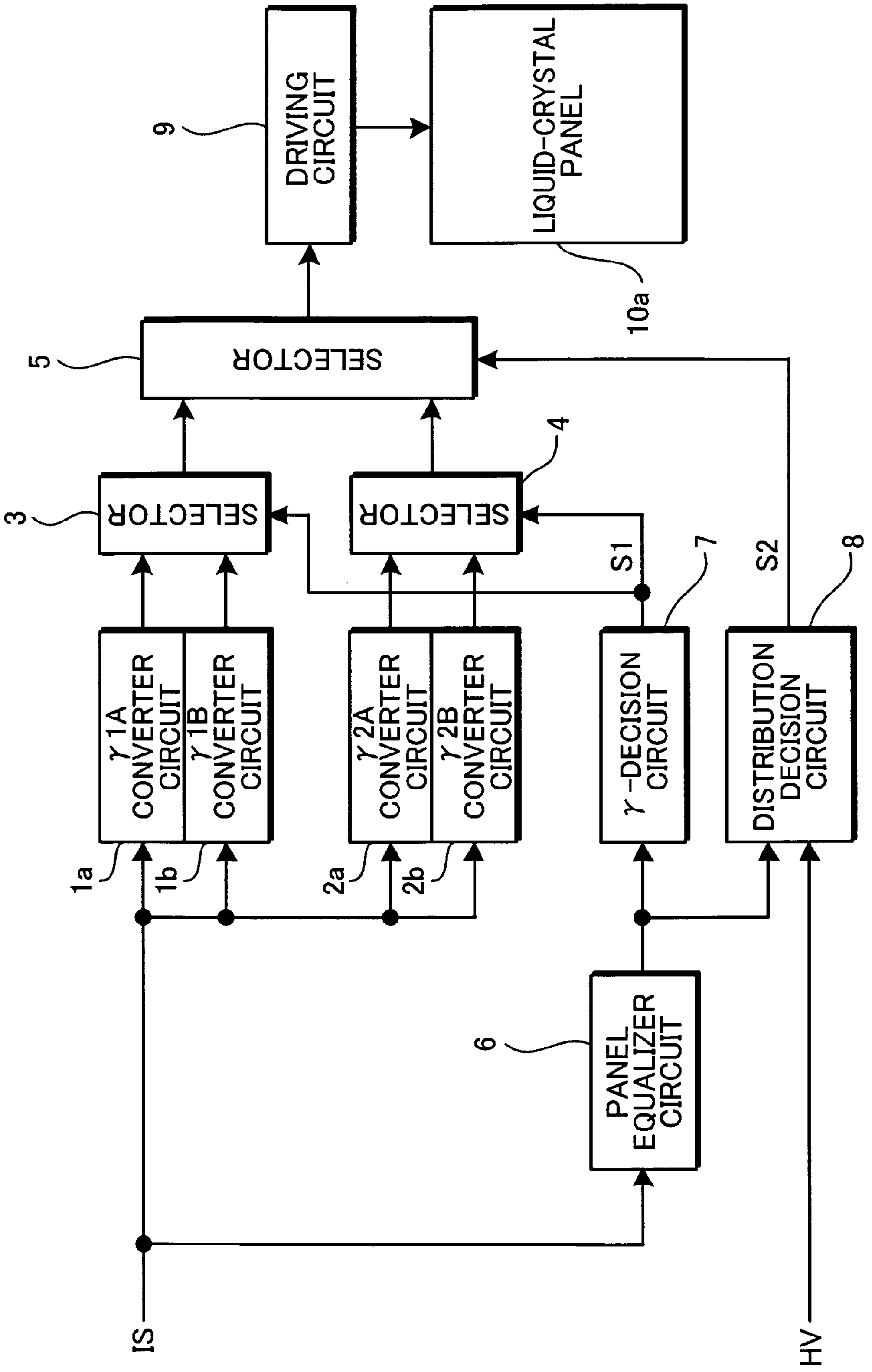
FIG. 7 is a block diagram, showing the configuration of a liquid-crystal display apparatus according to a second embodiment of the present invention.

Next, a liquid-crystal display apparatus according to a second embodiment of the present invention will be described. FIG. 7 is a block diagram, showing the configuration of the liquid-crystal display apparatus according to the second embodiment of the present invention. The liquid-crystal display apparatus shown in FIG. 7 includes: a γ1A converter circuit 1*a*; a γ1B converter circuit 1*b*; a γ2A converter circuit 2*a*; a γ2B converter circuit 2*b*; selectors 3 to 5; a panel equalizer circuit 6; a γ-decision circuit 7; a distribution decision circuit 8; a driving circuit 9; and a liquid-crystal panel 10*a*.

Figure 8:
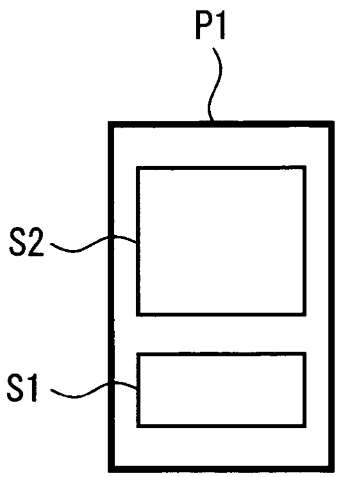
FIG. 8 is an illustration, showing the configuration of a pixel in a liquid-crystal panel shown in FIG. 7.

FIG. 8 is an illustration, showing the configuration of a pixel in a liquid-crystal panel shown in FIG. 7. In the liquid-crystal panel 10*a*, a pixel P1 as one pixel is made up of a first sub-pixel S1 which has a pixel area of Sa and a second sub-pixel S2 which has a pixel area of 2S*a*. It is a liquid-crystal panel in which a plurality of such pixels are disposed in matrix form. The first sub-pixel S1 and the second sub-pixel S2 are separately driven by two TFTs (or thin-film transistors, not shown).

As described above, the ratio of the pixel area of the first sub-pixel S1 to the pixel area of the second sub-pixel S2 is 1:2. The first γ-characteristic is used for either of the first sub-pixel S1 and the second sub-pixel S2 while the second γ-characteristic is used for the other. Thereby, the distribution area ratio of a sub-pixel for which the first γ-characteristic is used and the distribution area ratio of a sub-pixel for which the second γ-characteristic is used can be set at 2/3:1/3 or 1/3:2/3.

Incidentally, as the liquid-crystal panel 10*a*, various ones can be used, as long as it has sub-pixels. For example, such a liquid-crystal panel can be used as disclosed in Japanese Patent Laid-Open No. 7-191634 specification, Japanese Patent Laid-Open No. 8-15723 specification, Japanese Patent Laid-Open No. 8-201777 specification, or Japanese Patent Laid-Open No. 10-142577 specification. Besides, the number of sub-pixels included in one pixel is not limited especially to the above described example. Thus, three or more sub-pixels may also be used. In addition, the size of each sub-pixel or each pixel is not necessarily unified, and thus, different sizes may also be used at the same time. In these respects, a third embodiment described below is also the same.

In the γ1A converter circuit 1*a*, the γ1B converter circuit 1*b*, the γ2A converter circuit 2*a*, the γ2B converter circuit 2*b* and the panel equalizer circuit 6, a video signal IS is inputted which is separate according to each color component of R, G, B. In the distribution decision circuit 8, a synchronizing signal HV of the video signal IS is inputted, such as a vertical synchronizing signal and a horizontal synchronizing signal.

The γ1A converter circuit 1*a* γ-converts the video signal IS, using a first type of first γ-characteristic γ1A. Then, it outputs the γ-corrected video signal to the selector 3. The γ2A converter circuit 2*a* γ-converts the video signal IS, using a first type of second γ-characteristic γ2A. Then, it outputs the γ-corrected video signal to the selector 4. Herein, the first type of first γ-characteristic γ1A and second γ-characteristic γ2A are γ-characteristics which are complementary to each other. They are the first type of pair of γ-characteristics used for the video signal IS which has a low transmittance.

The γ1B converter circuit 1*b* γ-converts the video signal IS, using a second type of first γ-characteristic γ1B. Then, it outputs the γ-corrected video signal to the selector 3. The γ2B converter circuit 2*b* γ-converts the video signal IS, using a second type of second γ-characteristic γ2B. Then, it outputs the γ-corrected video signal to the selector 4. Herein, the second type of first γ-characteristic γ1B and second γ-characteristic γ2B are γ-characteristics which are complementary to each other. They are the second type of pair of γ-characteristics used for the video signal IS which has a high transmittance.

Figure 9:
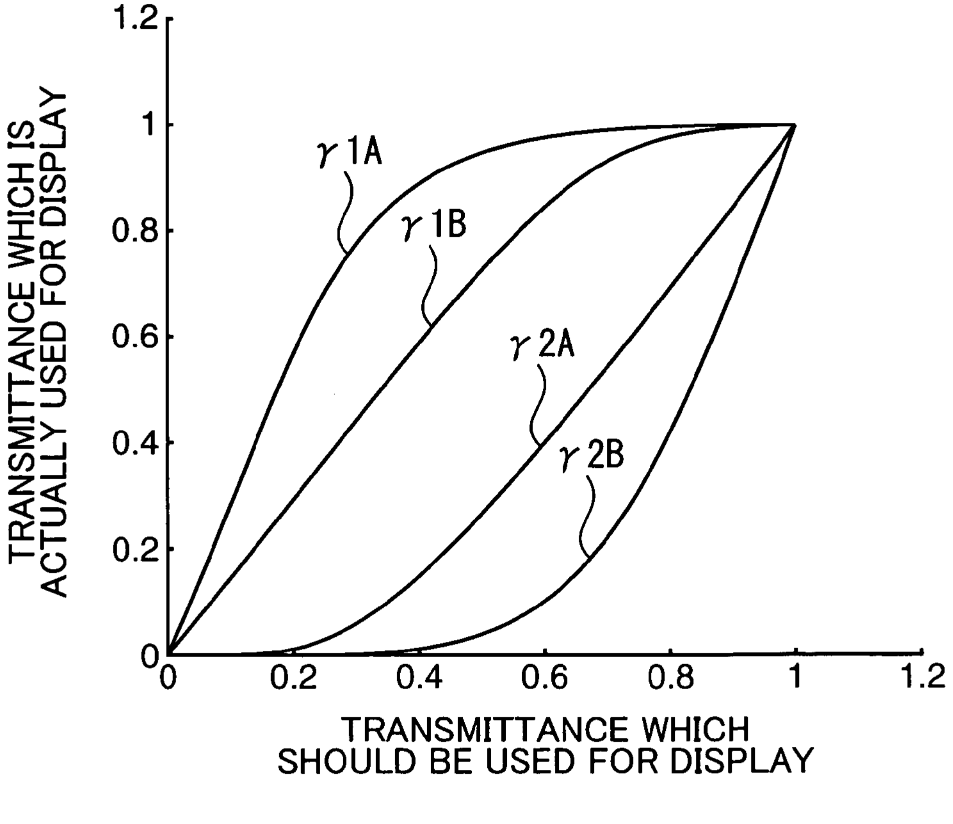
FIG. 9 is a graphical representation, showing an example of a first type of first γ-characteristic γ1A, a first type of second γ-characteristic γ2A, a second type of first γ-characteristic γ1B and a second type of second γ-characteristic γ2B which are used in the liquid-crystal display apparatus shown in FIG. 7.

FIG. 9 is a graphical representation, showing an example of the first type of first γ-characteristic γ1A, the first type of second γ-characteristic γ2A, the second type of first γ-characteristic γ1B and the second type of second γ-characteristic γ2B which are used in the liquid-crystal display apparatus shown in FIG. 7. As shown in FIG. 9, the γ1A converter circuit 1*a* has the first type of first γ-characteristic γ1A, and the γ2A converter circuit 2*a* has the first type of second γ-characteristic γ2A. Then, the γ1B converter circuit 1*b* has the second type of first γ-characteristic γ1B, and the γ2B converter circuit 2*b* has the second type of second y-characteristic γ2B.

The panel equalizer circuit 6 is a circuit which has a conversion characteristic equivalent to an input-and-output characteristic P(x) of the liquid-crystal panel 10*a*. It outputs a video signal into which the video signal IS has been converted using the input-and-output characteristic P(x) of the liquid-crystal panel 10*a*, to the γ-decision circuit 7 and the distribution decision circuit 8.

The γ-decision circuit 7 specifies a transmittance to be used for display from the video signal corrected by use of the input-and-output characteristic P(x) of the liquid-crystal panel 10*a*. Then, it outputs, to the selectors 3 and 4, a selection signal S1 for selecting a γ-converter circuit which executes a γ-conversion using the first and second γ-characteristics of the pair of γ-characteristics which corresponds to the transmittance it has specified.

The distribution decision circuit 8 specifies the pixel position of the video signal IS on the display screen of the liquid-crystal panel 1*a*, as a reference, using the vertical synchronizing signal and horizontal synchronizing signal of the synchronizing signal HV. It also specifies a transmittance to be used for display from the video signal corrected by use of the input-and-output characteristic P(x) of the liquid-crystal panel 10*a*. Then, it outputs, to the selector 5, a selection signal S2 for driving a sub-pixel using the distribution area ratio which corresponds beforehand to the pair of γ-characteristics of the transmittance it has specified.

The selector 3 selects one output out of the two outputs of the γ1A converter circuit 1*a* and the γ1B converter circuit 1*b* according to the selection signal S1. Then, it outputs it to the selector 5. It selects the output of the γ1A converter circuit 1*a* if the transmittance is low, and selects the output of the γ1B converter circuit 1*b* if the transmittance is high.

The selector 4 selects one output out of the two outputs of the γ2A converter circuit 2*a* and the γ2B converter circuit 2*b* according to the selection signal S1. Then, it outputs it to the selector 5. It selects the output of the γ2A converter circuit 2*a* if the transmittance is low, and selects the output of the γ2B converter circuit 2*b* if the transmittance is high.

The selector 5 selects an output to be supplied to the liquid-crystal panel 10*a* out of the two outputs of the selectors 3, 4 according to the selection signal S2. Then, it outputs it to the driving circuit 9. If the transmittance is low, in other words, if the first type of pair of γ-characteristics is selected, then the outputs of the γ1A converter circuit 1*a* and the γ2A converter circuit 2*a* are outputted to the driving circuit 9, so that the percentage of the distribution area ratio of a sub-pixel which is driven using the output of the first type of first γ-characteristic γ1A and the distribution area ratio of a sub-pixel which is driven using the output of the first type of second γ-characteristic γ2A becomes 1/3:2/3. On the other hand, If the transmittance is high, in other words, if the second type of pair of γ-characteristics is selected, then the outputs of the γ1B converter circuit 1*b* and the γ2B converter circuit 2*b* are outputted to the driving circuit 9, so that the percentage of the distribution area ratio of a sub-pixel which is driven using the output of the second type of first γ-characteristic γ1B and the distribution area ratio of a sub-pixel which is driven using the output of the second type of second γ-characteristic γ2B becomes 2/3:1/3.

The driving circuit 9 is formed by a polarity inverting circuit, a gate driving circuit, a source driving circuit, or the like. Using a video signal outputted from the selector 5, it drives the liquid-crystal panel 10*a* through the source driving circuit. Then, it displays an image indicated by the video signal IS in the liquid-crystal panel 10*a*.

In this embodiment, the liquid-crystal panel 10*a* corresponds to an example of the display panel; the γ1A converter circuit 1*a*, the γ1B converter circuit 1*b*, the γ2A converter circuit 2*a* and the γ2B converter circuit 2*b*, to an example of the converting means; and the selectors 3 to 5, the γ-decision circuit 7 and the distribution decision circuit 8, to an example of the selecting means.

Herein, let's generalize the above described processing. If the number of types of pairs of γ-characteristics is n (which is an integer of two or above) and if each pixel of the display panel is made up of a first sub-pixel which has a first pixel area Sa and a second sub-pixel which has a second pixel area Sb (=m×Sa, herein, m>1), then in a block unit of the first sub-pixel and the second sub-pixel per block, an output to be supplied to the liquid-crystal panel is selected from among the 2n γ-corrected outputs, so that the percentage of the first distribution area ratio of sub-pixels driven by a video signal γ-corrected by use of the first γ-characteristic of each pair of γ-characteristics and the second distribution area ratio of sub-pixels driven by a video signal γ-corrected by use of the second γ-characteristic are equal to a distribution area ratio specified in advance for each pair of γ-characteristics. At this time, the first distribution area ratio and the second γ distribution area ratios for each pair of γ-characteristics are selected out of 1/(m+1) and m/(m+1). Herein, it is preferable that the above described second pixel area Sb satisfy the relation of 1.5Sa≦Sb≦3Sa. In this case, without lowering a display definition, using a display panel which includes two types of sub-pixels, a good viewing angle characteristic can be realized at a wide-ranging transmittance.

Figure 10:
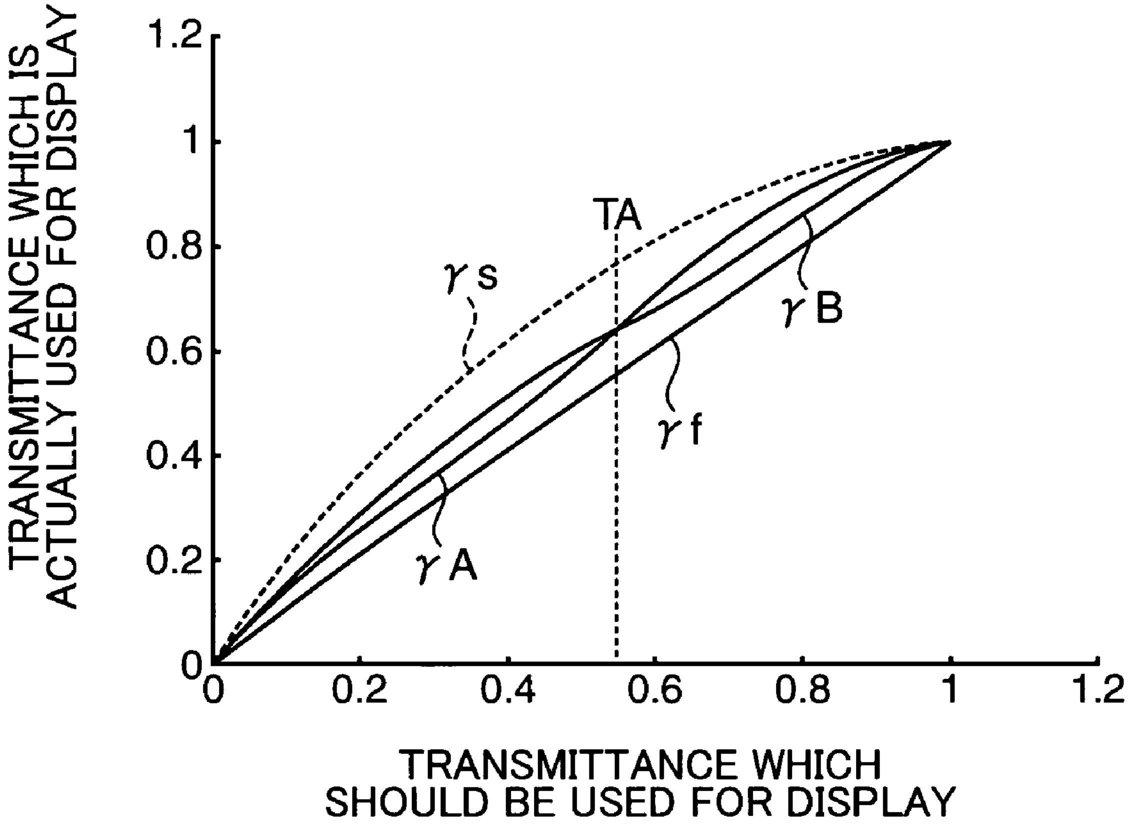
FIG. 10 is a graphical representation, showing an example of the control of a γ-characteristic in accordance with a transmittance in the liquid-crystal display apparatus shown in FIG. 7.

Next, an example will be described of the control of a γ-characteristic in accordance with a transmittance in the liquid-crystal display apparatus which has the above described configuration. FIG. 10 is a graphical representation, showing the example of the control of a γ-characteristic in accordance with a transmittance in the liquid-crystal display apparatus shown in FIG. 7.

As shown in FIG. 10, first, if the transmittance which should be used for display is within a range of 0 to TA, the γ-decision circuit 7 outputs, to the selectors 3, 4, a selection signal S1 for selecting the γ1A converter circuit 1*a* and the γ2A converter circuit 2*a*. Then, the selectors 3, 4 select the outputs of the γ1A converter circuit 1*a* and the γ2A converter circuit 2*a* and output them to the selector 5. The distribution decision circuit 8 outputs, to the selector 5, a selection signal S2 for driving the first sub-pixel S1 using the output of the first type of first γ-characteristic γ1A and driving the second sub-pixel S2 using the output of the first type of second γ-characteristic γ2A. The selector 5 selects the outputs of the γ1A converter circuit 1*a* and the γ2A converter circuit 2*a*, so that the driving circuit 9 can drive the first sub-pixel S1 using the output of the first type of first γ-characteristic γ1A and drive the second sub-pixel S2 using the output of the first type of second γ-characteristic γ2A. Then, it outputs them to the driving circuit 9. Consequently, if the transmittance which should be used for display is within the range of 0 to TA, the liquid-crystal panel 10*a* can be driven using the video signal γ-corrected by use of the first type of synthetic γ-characteristic γA which is least shifted from the reference γ-characteristic γf.

Next, if the transmittance which should be used for display is within a range of TA to 1, the γ-decision circuit 7 outputs, to the selectors 3, 4, a selection signal S1 for selecting the γ1B converter circuit 1*b* and the γ2B converter circuit 2*b*. Then, the selectors 3, 4 select the outputs of the γ1B converter circuit 1*b* and the γ2B converter circuit 2*b* and output them to the selector 5. The distribution decision circuit 8 outputs, to the selector 5, a selection signal S2 for driving the second sub-pixel S2 using the output of the second type of first γ-characteristic γ1B and driving the first sub-pixel S1 using the output of the second type of second γ-characteristic γ2B. The selector 5 selects the outputs of the γ1B converter circuit 1*b* and the γ2B converter circuit 2*b*, so that the driving circuit 9 can drive the second sub-pixel S2 using the output of the second type of first γ-characteristic γ1B and drive the first sub-pixel S1 using the output of the second type of second γ-characteristic γ2B. Then, it outputs them to the driving circuit 9. As a result, if the transmittance which should be used for display is within the range of TA to 1, the liquid-crystal panel 10*a* can be driven using the video signal γ-corrected by use of the second type of synthetic γ-characteristic γB which is least shifted from the reference γ-characteristic γf.

As described above, in this embodiment, the video signal IS is γ-converted, using two pairs of γ-characteristics which are made up of first and second γ-characteristics different from each other. Then, one pair of γ-characteristics are selected out of the two pairs of γ-characteristics according to a transmittance to be used for display, and an output to be supplied to the liquid-crystal panel 10*a* is selected from among the four outputs so that the distribution area ratio of sub-pixels driven by the video signal γ-corrected by use of the first γ-characteristic of the selected pairs of γ-characteristics and the distribution area ratio of sub-pixels driven by the video signal γ-corrected by use of the second γ-characteristic of the selected pairs of γ-characteristics are equal to a distribution area ratio specified in advance for each pair of γ-characteristics. Therefore, the video signals γ-corrected by use of the first and the second γ-characteristics most suitable for a transmittance to be used for display are selected at the most suitable distribution area ratio for the transmittance to be used for display. This helps realize a good viewing angle characteristic at every transmittance.

Figure 11:
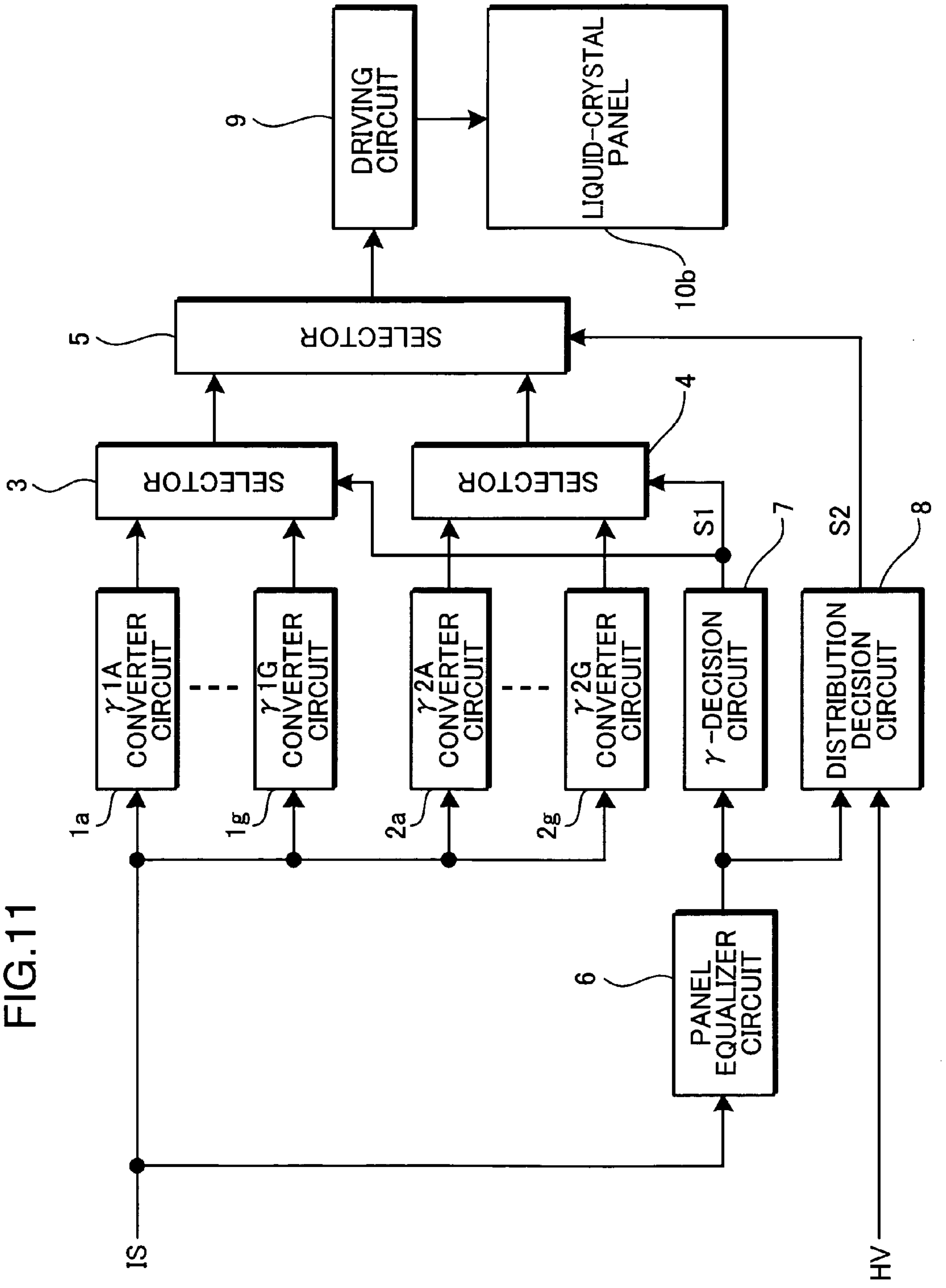
FIG. 11 is a block diagram, showing the configuration of a liquid-crystal display apparatus according to a third embodiment of the present invention.

Next, a liquid-crystal display apparatus according to a third embodiment of the present invention will be described. FIG. 11 is a block diagram, showing the configuration of the liquid-crystal display apparatus according to the third embodiment of the present invention. The liquid-crystal display apparatus shown in FIG. 11 includes: a γ1A converter circuit 1*a* to a γ1G converter circuit 1*g*, seven in total; a γ2A converter circuit 2*a* to a γ2G converter circuit 2*g*, seven in total; selectors 3 to 5; a panel equalizer circuit 6; a γ-decision circuit 7; a distribution decision circuit 8; a driving circuit 9; and a liquid-crystal panel 10*b*.

Figure 12:
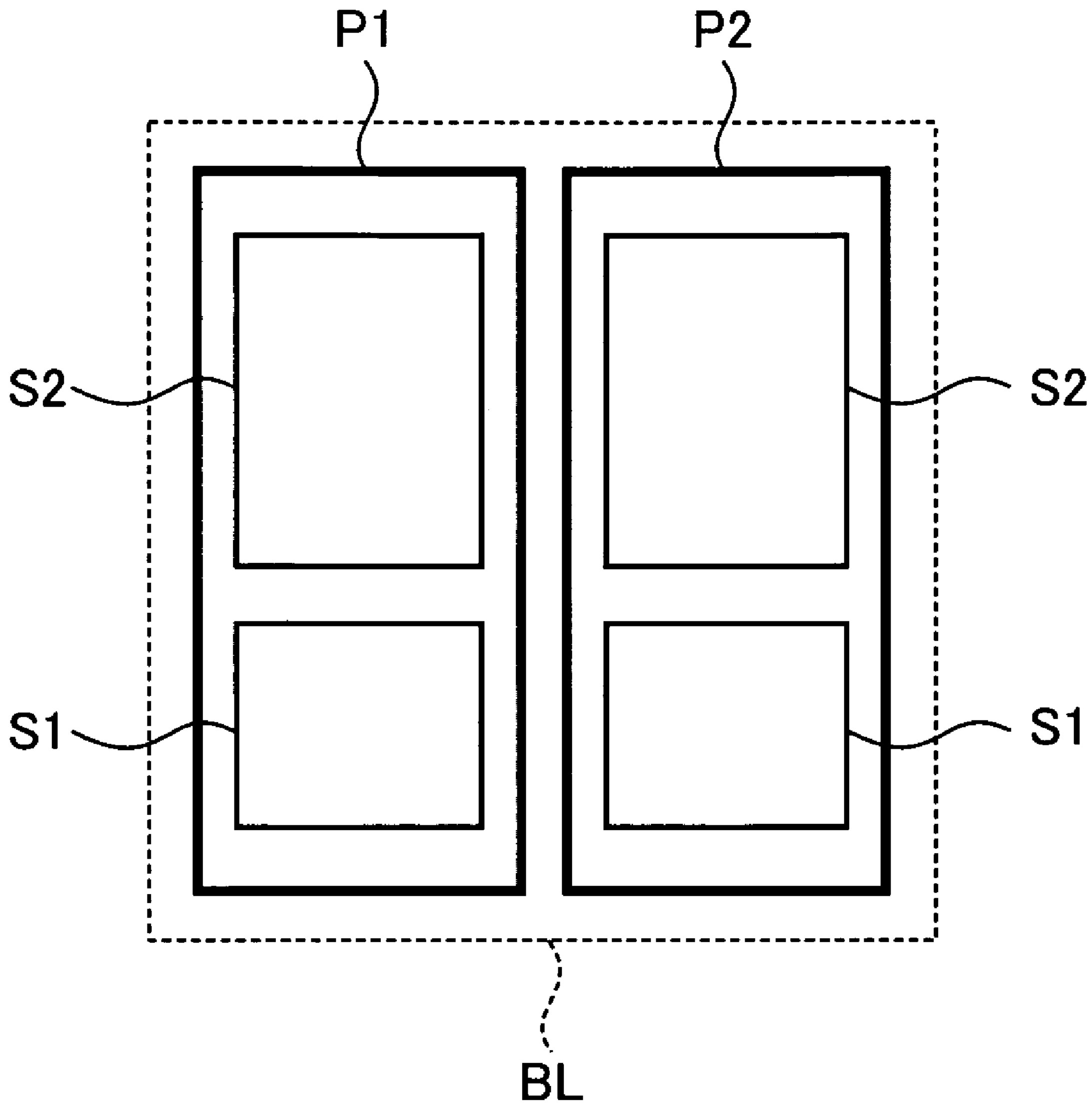
FIG. 12 is an illustration, showing the configuration of a pixel in a liquid-crystal panel shown in FIG. 11.

FIG. 12 is an illustration, showing the configuration of a pixel in a liquid-crystal panel shown in FIG. 11. In the liquid-crystal panel 10*b*, pixels P1, P2 as one pixel is made up of a first sub-pixel S1 which has a pixel area of Sa and a second sub-pixel S2 which has a pixel area of 1.5 Sa. It is a liquid-crystal panel in which a plurality of such pixels are disposed in matrix form. The first sub-pixel S1 and the second sub-pixel S2 are separately driven by two TFTs (not shown). In a block BL of two pixels P1, P2, the four sub-pixel S1, S2 are individually driven by four TFTs.

As described above, the ratio of the pixel area of the first sub-pixel S1 to the pixel area of the second sub-pixel S2 is 2:3. Inside of such a single block BL, the combination of the first sub-pixel S1 and the second sub-pixel S2 is variously changed. Thereby, the distribution area ratio of a sub-pixel for which the first γ-characteristic is used and the distribution area ratio of a sub-pixel for which the second γ-characteristic is used can be set at 2/10:8/10, 3/10:7/10, 4/10:6/10, 5/10:5/10, 6/10:4/10, 7/10:3/10, or 8/10:2/10.

In the γ1A converter circuit 1*a* to the γ1G converter circuit 1*g*, the γ2A converter circuit 2*a* to the γ2G converter circuit 2*g* and the panel equalizer circuit 6, a video signal IS is inputted which is separate according to each color component of R, G, B. In the distribution decision circuit 8, a synchronizing signal HV of the video signal IS is inputted, such as a vertical synchronizing signal and a horizontal synchronizing signal.

The γ1A converter circuit 1*a* γ-converts the video signal IS, using a first type of first γ-characteristic γ1A. Then, it outputs the γ-corrected video signal to the selector 3. The γ2A converter circuit 2*a* γ-converts the video signal IS, using a first type of second γ-characteristic γ2A. Then, it outputs the γ-corrected video signal to the selector 4. Herein, the first type of first γ-characteristic γ1A and the first type of second γ-characteristic γ2A are γ-characteristics which are complementary to each other. They are the first type of pair of γ-characteristics used for the video signal IS within the lowest transmittance range.

In the same way as described above, the γ1B converter circuit 1*b* to the γ1G converter circuit 1*g* γ-converts the video signal IS, using second to seventh types of first γ-characteristics γ1B to γ1G. Then, it outputs the γ-corrected video signal to the selector 3. The γ2C converter circuit 2*c* to the γ2G converter circuit 2*g* γ-converts the video signal IS, using second to seventh types of second γ-characteristics γ2B to γ2G. Then, it outputs the γ-corrected video signal to the selector 4. Herein, the second to seventh types of first γ-characteristics γ1B to γ1G and the second to seventh types of second γ-characteristics γ2B to γ2G are γ-characteristics which are complementary to each other, respectively. They are the second to seventh types of pairs of γ-characteristics used for the video signal IS within the second to seventh lowest transmittance range.

Figure 13:
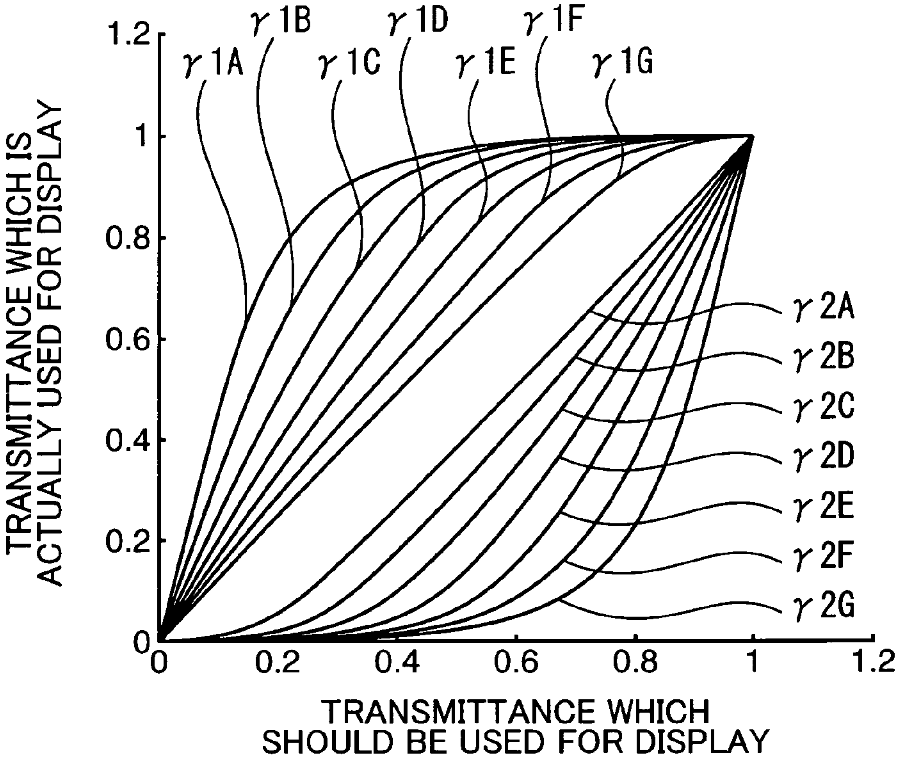
FIG. 13 is a graphical representation, showing an example of first to seventh types of first γ-characteristics γ1A to γ1G and second γ-characteristics γ2A to γ2G which are used in the liquid-crystal display apparatus shown in FIG. 11.

FIG. 13 is a graphical representation, showing an example of the first to seventh types of first γ-characteristics γ1A to γ1G and the second γ-characteristics γ2A to γ2G which are used in the liquid-crystal display apparatus shown in FIG. 11. As shown in FIG. 13, the γ1A converter circuit 1*a* has the first type of first γ-characteristic γ1A, and the γ2A converter circuit 2*a* has the first type of second γ-characteristic γ2A. After this, similarly, the γ1B converter circuit 1*b* to the γ1G converter circuit 1*g* have the second to seventh types of first γ-characteristics γ1B to γ1G, and the γ2B converter circuit 2*b* to the γ2G converter circuit 2*g* has the second to seventh types of second γ-characteristics γ2B to γ2G.

The panel equalizer circuit 6 is a circuit which has a conversion characteristic equivalent to an input-and-output characteristic P(x) of the liquid-crystal panel 10*b*. It outputs a video signal into which the video signal IS has been converted using the input-and-output characteristic P(x) of the liquid-crystal panel 10*b*, to theγ-decision circuit 7 and the distribution decision circuit 8.

The γ-decision circuit 7 specifies a transmittance to be used for display from the video signal corrected by use of the input-and-output characteristic P(x) of the liquid-crystal panel 10*b*. Then, it outputs, to the selectors 3 and 4, a selection signal S1 for selecting a γ-converter circuit which executes a γ-conversion using the first and second γ-characteristics of the pair of γ-characteristics which corresponds to the transmittance it has specified.

The distribution decision circuit 8 specifies the pixel position of the video signal IS on the display screen of the liquid-crystal panel 10*b*, as a reference, using the vertical synchronizing signal and horizontal synchronizing signal of the synchronizing signal HV. It also specifies a transmittance to be used for display from the video signal corrected by use of the input-and-output characteristic P(x) of the liquid-crystal panel 10*b*. Then, it outputs, to the selector 5, a selection signal S2 for changing the γ-characteristic to the distribution area ratio which corresponds beforehand to the pair of γ-characteristics of the transmittance it has specified.

The selector 3 selects one output from among the seven outputs of the γ1A converter circuit 1*a* to the γ1G converter circuit 1*g* according to the selection signal S1. Then, it outputs it to the selector 5. It selects the output of the γ1A converter circuit 1*a* if the transmittance is within the lowest range, and selects the outputs of the γ1B converter circuit 1*b* to the γ1G converter circuit 1*g* according to an increase in the transmittance.

The selector 4 selects one output from among the seven outputs of the γ2A converter circuit 2*a* to the γ2G converter circuit 2*g* according to the selection signal S1. Then, it outputs it to the selector 5. It selects the output of the γ2A converter circuit 2*a* if the transmittance is within the lowest range, and selects the outputs of the γ2B converter circuit 2*b* to the γ2G converter circuit 2*g* according to an increase in the transmittance.

The selector 5 selects an output to be supplied to the liquid-crystal panel 10*b* from among the seven outputs of the selectors 3, 4 according to the selection signal S2. Then, it outputs it to the driving circuit 9. Specifically, if the transmittance is within the lowest range, in other words, if the first type of pair of γ-characteristics is selected, then the selector 5 outputs the outputs of the γ1A converter circuit 1*a* and the γ2A converter circuit 2*a* to the driving circuit 9, so that the percentage of the distribution area ratio of a sub-pixel which is driven using the output of the first type of first γ-characteristic γ1A and the distribution area ratio of a sub-pixel which is driven using the output of the first type of second γ-characteristic γ2A becomes 2/10:8/10. After this, in the same way, if the second to seventh types of pairs of γ-characteristics are selected according to an increase in the transmittance, then it outputs, to the driving circuit 9, the outputs of the γ1B converter circuit 1*b* to the γ1G converter circuit 1*g* and the γ2B converter circuit 2*b* to the γ2G converter circuit 2*g* are outputted to the driving circuit 9, so that the percentage of the distribution area ratio of a sub-pixel which is driven using the output of the second to seventh types of first γ-characteristics γ1B to γ1G and the distribution area ratio of a sub-pixel which is driven using the output of the second to seventh types of second γ-characteristics γ2B to γ2G becomes 3/10:7/10, 4/10:6/10, 5/10:5/10, 6/10:4/10, 7/10:3/10, 8/10:2/10, respectively.

The driving circuit 9 is formed by a polarity inverting circuit, a gate driving circuit, a source driving circuit, or the like. Using a video signal outputted from the selector 5, it drives the liquid-crystal panel 10*b* through the source driving circuit. Then, it displays an image indicated by the video signal IS in the liquid-crystal panel 10*b*.

Herein, let's generalize the above described processing. If the number of types of pairs of γ-characteristics is n (which is an integer of two or above) and if each pixel of the display panel is made up of a first sub-pixel which has a first pixel area Sa and a second sub-pixel which has a second pixel area Sb (=m×Sa, herein, m>1), then in a block unit of the two pixels per block, an output to be supplied to the liquid-crystal panel is selected from among the 2n γ-corrected outputs, so that the percentage of the first distribution area ratio of sub-pixels driven by a video signal γ-corrected by use of the first γ-characteristic of each pair of γ-characteristics and the second distribution area ratio of sub-pixels driven by a video signal γ-corrected by use of the second γ-characteristic are equal to a distribution area ratio specified in advance for each pair of γ-characteristics. At this time, the first distribution area ratio and the second γ distribution area ratios for each pair of γ-characteristics are selected from among 1/(2+2m), m/(2+2m), 2/(2+2m), (1+m)/(2+2m), 2m/(2+2m), (2+m)/(2+2m) and (2m+1)/(2+2m). Herein, it is preferable that the above described second pixel area Sb satisfy the relation of 1.2Sa≦Sb≦2Sa. In this case, without lowering a display definition, using a display panel which includes two types of sub-pixels, a good viewing angle characteristic can be realized at a wide-ranging transmittance.

In this embodiment, the liquid-crystal panel 10*b* corresponds to an example of the display panel; the γ1A converter circuit 1*a* to the γ1G converter circuit 1*g* and the γ2A converter circuit 2*a* to the γ2G converter circuit 2*g*, to an example of the converting means; and the selectors 3 to 5, the γ-decision circuit 7 and the distribution decision circuit 8, to an example of the selecting means.

Figure 14:
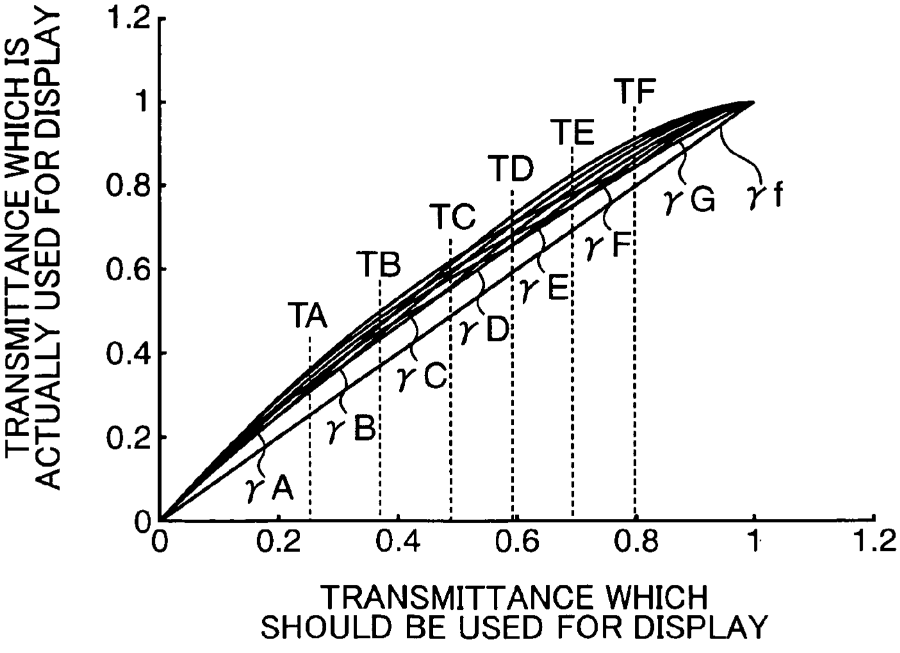
FIG. 14 is a graphical representation, showing an example of the control of a γ-characteristic in accordance with a transmittance in the liquid-crystal display apparatus shown in FIG. 11.

Next, an example will be described of the control of a γ-characteristic in accordance with a transmittance in the liquid-crystal display apparatus which has the above described configuration. FIG. 14 is a graphical representation, showing the example of the control of a γ-characteristic in accordance with a transmittance in the liquid-crystal display apparatus shown in FIG. 11. FIG. 15 to FIG. 18 are a graphical representation, showing first to fourth partially-enlarged parts of the graphical representation shown in FIG. 14, respectively.

Figure 15:
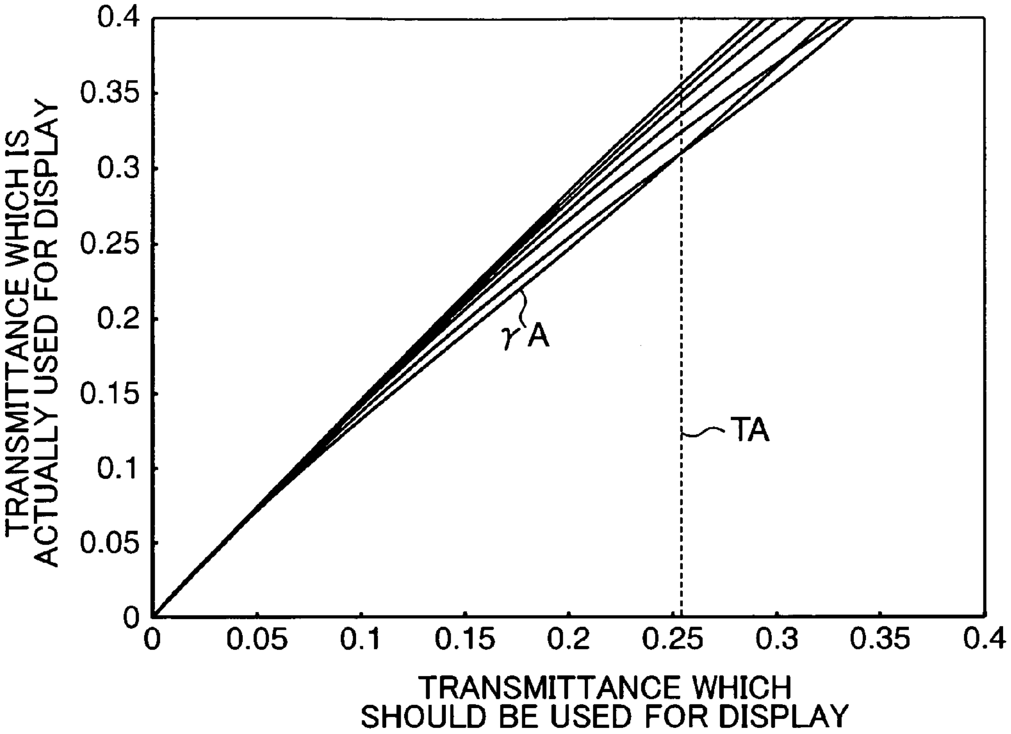
FIG. 15 is a graphical representation, showing a first partially-enlarged part of the graphical representation shown in FIG. 14.
Figure 16:
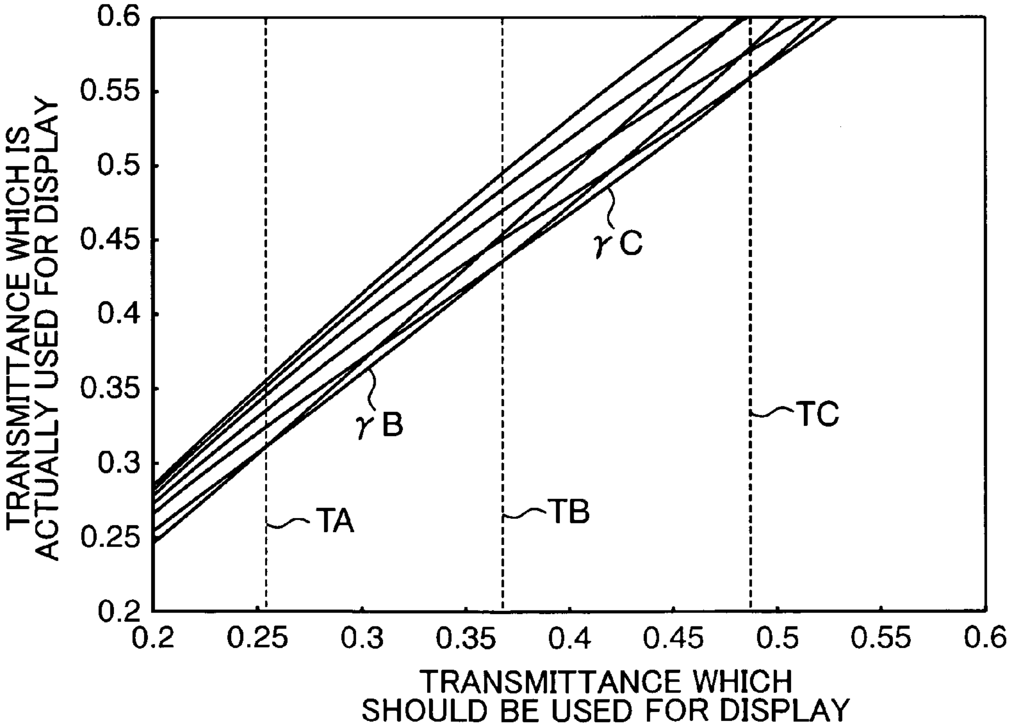
FIG. 16 is a graphical representation, showing a second partially-enlarged part of the graphical representation shown in FIG. 14.
Figure 17:
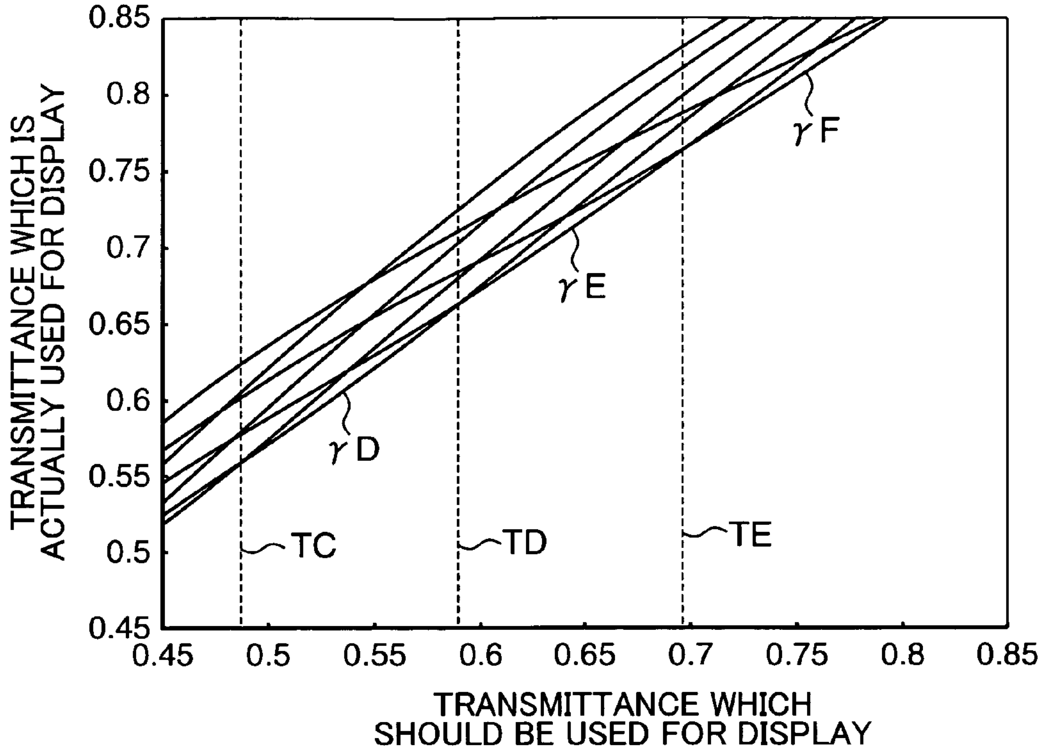
FIG. 17 is a graphical representation, showing a third partially-enlarged part of the graphical representation shown in FIG. 14.
Figure 18:
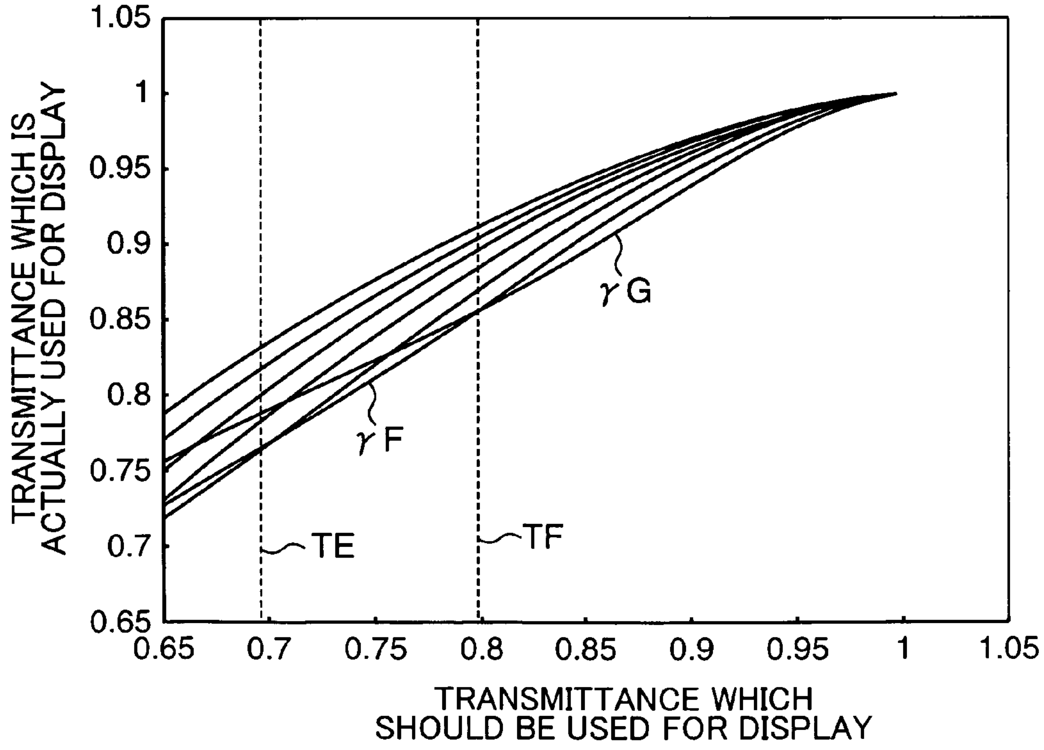
FIG. 18 is a graphical representation, showing a fourth partially-enlarged part of the graphical representation shown in FIG. 14.

As shown in FIG. 14 and FIG. 15, first, if the transmittance which should be used for display is within a range of 0 to TA, they-decision circuit 7 outputs, to the selectors 3, 4, a selection signal S1 for selecting the γ1A converter circuit 1*a* and the γ2A converter circuit 2*a*. Then, the selectors 3, 4 select the outputs of the γ1A converter circuit 1*a* and the γ2A converter circuit 2*a* and output them to the selector 5. The distribution decision circuit 8 outputs, to the selector 5, a selection signal S2 for setting the distribution area ratio of sub-pixels driven using the output of the first type of first γ-characteristic γ1A and the distribution area ratio of sub-pixels driven using the output of the first type of second γ-characteristic γ2A at 2/10:8/10. The selector 5 selects the outputs of the γ1A converter circuit 1*a* and the γ2A converter circuit 2*a*, so that the percentage of the distribution area ratio of sub-pixels driven using the output of the first type of first γ-characteristic γ1A and the distribution area ratio of sub-pixels driven using the output of the first type of second γ-characteristic γ2A becomes 2/10:8/10. Then, it outputs, to the driving circuit 9, the video signal γ-corrected by use of the first type of synthetic γ-characteristic γA. Consequently, if the transmittance which should be used for display is within the range of 0 to TA, the liquid-crystal panel 10*b* can be driven using the video signal as γ corrected by use of the first type of synthetic γ-characteristic γA which is least shifted from the reference γ-characteristic γf.

After this, in the same way as described above, if the transmittance which should be used for display is within each range of TA to TB, TB to TC, TC to TD, TD to TE, TE to TF, TF to 1 (see FIG. 16 to FIG. 18), then the γ-decision circuit 7 outputs, to the selectors 3, 4, a selection signal S1 for selecting the γ1B converter circuit 1*b* and the γ2B converter circuit 2*b* to the γ1G converter circuit 1*g* and the γ2G converter circuit 2*g* . Then, the selectors 3, 4 select the outputs of the γ1B converter circuit 1*b* and the γ2B converter circuit 2*b* to the γ1G converter circuit 1*g* and the γ2G converter circuit 2*g*. Sequentially, they output them to the selector 5. The distribution decision circuit 8 outputs, to the selector 5, a selection signal S2 for setting the distribution area ratio of sub-pixels driven using the output of the second to seventh types of first γ-characteristics γ1B to γ1G and the distribution area ratio of sub-pixels driven using the output of the second to seventh types of second γ-characteristics γ2B to γ2G at 3/10:7/10, 4/10:6/10, 5/10:5/10, 6/10:4/10, 7/10:3/10, 8/10:2/10, respectively. The selector 5 selects the outputs of the γ1B converter circuit 1*b* and the γ2B converter circuit 2*b* to the γ1G converter circuit 1*g* and the γ2G converter circuit 2*g*, so that the percentage of the distribution area ratio of sub-pixels driven using the output of the second to seventh types of first γ-characteristics γ1B to γ1G and the distribution area ratio of sub-pixels driven using the output of the second to seventh types of second γ-characteristics γ2B to γ2G becomes 3/10:7/10, 4/10:6/10, 5/10:5/10, 6/10:4/10, 7/10:3/10, 8/10:2/10, respectively. Then, it outputs, to the driving circuit 9, the video signal γ-corrected by use of the second to seventh types of synthetic γ-characteristics γB to γG. As a result, if the transmittance which should be used for display is within each range of TA to TB, TB to TC, TC to TD, TD to TE, TE to TF, TF to 1, the liquid-crystal panel lob can be driven using the video signal γ-corrected by use of the second to seventh types of synthetic γ-characteristics γB to γG which is least shifted from the reference γ-characteristic γf.

As described above, in this embodiment, the video signal IS is γ-converted, using seven pairs of γ-characteristics which are made up of first and second γ-characteristics different from each other. Then, one pair of γ-characteristics are selected from among the seven pairs of γ-characteristics according to a transmittance to be used for display, and an output to be supplied to the liquid-crystal panel 10*a* is selected from among the fourteen outputs so that the distribution area ratio of sub-pixels driven by the video signal as γ corrected by use of the first γ-characteristic of the selected pairs of γ-characteristics and the distribution area ratio of sub-pixels driven by the video signal as γ corrected by use of the second γ-characteristic of the selected pairs of γ-characteristics are equal to a distribution area ratio specified in advance for each pair of γ-characteristics. Therefore, the video signals γ-corrected by use of the first and the second γ-characteristics most suitable for a transmittance to be used for display are selected at the most suitable distribution area ratio for the transmittance to be used for display. This helps realize a good viewing angle characteristic at every transmittance.

As described so far, the present invention is useful for a matrix-type display apparatus or the like which is capable of displaying an image by driving a plurality of pixels disposed in matrix form and realizing a good viewing angle characteristic at a wide-ranging transmittance.

The invention claimed is:

1. A matrix-type display apparatus which drives a display panel including a plurality of pixels disposed in matrix form and displays an image, comprising:

a converting portion adapted to gamma-convert an input video signal, using n (which is an integer of two or above) pairs of gamma-characteristics each made up of first and second gamma-characteristics different from each other, the gamma-characteristics being a transmittance characteristic according to an input level and the n pairs of gamma-characteristics being different from each other; and a selecting portion adapted to specify a transmittance to be used for display based on the input video signal, to select one pair of gamma-characteristics from among the n pairs of gamma-characteristics according to the specified transmittance to be used for display, and to select an output supplied to the display panel from among 2n outputs which are gamma-corrected by said converting portion, so that a ratio between a first distribution area of pixels driven by the video signal gamma-corrected by use of the first gamma-characteristic of the selected pairs of gamma-characteristics and a second distribution area of pixels driven by the video signal gamma-corrected by use of the second gamma-characteristic of the selected pairs of gamma-characteristics is equal to a distribution area ratio specified in advance for the selected pairs of gamma-characteristics, and with respect to a plurality of division ranges each division range being different and set by dividing a range of transmittance to be used for display, a different pair of gamma-characteristics and a different distribution area ratio are used, wherein the selecting portion produces a synthetic gamma-characteristic which is a gamma-characteristic synthesized from the first gamma-characteristic and the second gamma-characteristic, by switching between the video signal gamma-corrected by use of the first gamma-characteristic of the selected pair of gamma-characteristics and the video signal gamma-corrected by use of the second gamma-characteristic of the selected pair of gamma-characteristics using the distribution area ratio and with respect to each of the division ranges, the synthetic gamma-characteristic of the pair of gamma-characteristics produced by the selecting portion is closest to a reference gamma-characteristic at the front vision.

2. The matrix-type display apparatus according to claim 1, wherein a block comprises (n+1) pixels; and said selecting portion selects an output supplied to the display panel from among the 2n outputs which are gamma-corrected by said converting portion, so that the ratio between the first distribution area and the second distribution area is equal to the distribution area ratio in the block.

3. The matrix-type display apparatus according to claim 2, wherein the ratio of the first distribution area per block with the area of the pixels per block and the ratio of the second distribution area per block with the area of the pixels per block for each pair of gamma-characteristics are selected out of k/(n+1) and (n+1k)/(n+1), where k is an integer of one to n.

4. The matrix-type display apparatus according to claim 1, wherein:

a block comprises one pixel;

each pixel of the display panel is made up of, as one pixel, a first sub-pixel which has a first pixel area Sa and a second sub-pixel which has a second pixel area Sb (=m×Sa, herein, m>1); and said selecting portion selects an output supplied to the display panel from among the 2n outputs which are gamma-corrected by said converting portion, so that the ratio of the first distribution area and the second distribution area is equal to the distribution area ratio in the block.

5. The matrix-type display apparatus according to claim 4, wherein the ratio of the first distribution area with the area of the pixel and the ratio of the second distribution area with the area of the pixel for each pair of gamma-characteristics are selected out of 1/(m+1) and m/(m+1).

6. The matrix-type display apparatus according to claim 5, wherein the second pixel area Sb satisfies the relation of $1.5Sa \leqq Sb \leqq 3Sa$.

7. The matrix-type display apparatus according to claim 1, wherein:

each pixel of the display panel is made up of, as one pixel, a first sub-pixel which has a first pixel area Sa and a second sub-pixel which has a second pixel area Sb (=m× Sa, herein, m>1); and a block comprised two pixels; and said selecting portion selects an output supplied to the display panel from among the 2n outputs which are gamma-corrected using each gamma-characteristic by said converting portion, so that ratio of the first distribution area and the second distribution area is equal to the distribution area ratio in the block.

8. The matrix-type display apparatus according to claim 7, wherein the ratio of the first distribution area with the area of the block and the ratio of the second distribution area with the area of the block for each pair of gamma-characteristics are selected from among 1/(2+2m), m/(2+2m), 2/(2+2m), (1+m)/(2+2m), 2m/(2+2m), (2+m)/(2+2m), and (2m+1)/(2+2m).

9. The matrix-type display apparatus according to claim 8, wherein the second pixel area Sb satisfies the relation of $1.2Sa \leqq Sb \leqq 2Sa$.

10. The matrix-type display apparatus according to claim 1, wherein said selecting portion selects an output supplied to the display panel from among the 2n outputs which are gamma-corrected by said converting portion, in a pixel made up of a red-pixel, a green-pixel and a blue-pixel.

11. The matrix-type display apparatus according to claim 1, wherein said selecting portion selects an output supplied to the display panel from among the 2n outputs which are gamma-corrected by said converting portion, for each of a red-pixel, a green-pixel and a blue-pixel comprised by one pixel.

12. The matrix-type display apparatus according to claim 1, wherein the display panel is a liquid-crystal display panel.

13. A driving method for a matrix-type display apparatus which drives a display panel including a plurality of pixels disposed in matrix form and displays an image, comprising:

a converting step of gamma-converting an input video signal, using n (which is an integer of two or above) pairs of gamma-characteristics which are made up of first and second gamma-characteristics different from each other, the gamma-characteristics being a transmittance characteristic according to an input level and the n pairs of gamma-characteristics being different from each other; and a selecting step of specifying a transmittance to be used for display based on the input video signal, selecting one pair of gamma-characteristics from among the n pairs of gamma-characteristics according to the specified transmittance to be used for display, and selecting an output supplied to the display panel from among 2n outputs which are gamma-corrected in the converting step, so that a ratio between a first distribution area of pixels driven by the video signal gamma-corrected by use of the first gamma-characteristic of the selected pairs of gamma-characteristics and a second distribution area of pixels driven by the video signal gamma-corrected by use of the second gamma-characteristic of the selected pairs of gamma-characteristics is equal to a distribution area ratio specified in advance for the selected pairs of gamma-characteristics and with respect to a plurality of division ranges each division range being different and set by dividing a range of transmittance to be used for display, a different pair of gamma-characteristics and a different distribution area ratio are used, wherein the selecting step produces a synthetic gamma-characteristic which is a gamma-characteristic synthesized from the first gamma-characteristic and the second gamma-characteristic, by switching between the video signal gamma-corrected by use of the first gamma-characteristic of the selected pair of gamma-characteristics and the video signal gamma-corrected by use of the second gamma-characteristic of the selected pair of gamma-characteristics using the distribution area ratio and with respect to each of the division ranges the synthetic gamma-characteristic of the pair of gamma-characteristics produced by the selecting step is closest to a reference gamma-characteristic at the front vision.

* * * * *